United States Patent
Lee et al.

(10) Patent No.: US 8,374,611 B2
(45) Date of Patent: *Feb. 12, 2013

(54) METHOD FOR COMPULSORILY PERFORMING HANDOVER IN BROADBAND WIRELESS COMMUNICATION SYSTEM

(75) Inventors: Sung-Jin Lee, Gyeonggi-do (KR);
Chang-Hoi Koo, Gyeonggi-do (KR);
Jung-Je Son, Gyeonggi-do (KR);
Yeong-Moon Son, Gyeonggi-do (KR);
So-Hyun Kim, Gyeonggi-do (KR);
Hyun-Jeong Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/337,805

(22) Filed: Dec. 27, 2011

(65) Prior Publication Data

US 2012/0094711 A1 Apr. 19, 2012

Related U.S. Application Data

(63) Continuation of application No. 12/493,911, filed on Jun. 29, 2009, now Pat. No. 8,112,088, which is a continuation of application No. 10/932,515, filed on Sep. 2, 2004, now Pat. No. 7,877,093.

(30) Foreign Application Priority Data

Sep. 4, 2003 (KR) .................. 10-2003-0061945

(51) Int. Cl.
*H04W 36/00* (2009.01)
*H04M 3/00* (2006.01)
(52) U.S. Cl. ...................... 455/436; 455/418
(58) Field of Classification Search .................. 455/436, 455/438, 439; 370/331–337
See application file for complete search history.

(56) References Cited

U.S. PATENT DOCUMENTS

| | | | |
|---|---|---|---|
| 5,008,900 A | 4/1991 | Critchlow et al. |
| 5,267,261 A | 11/1993 | Blakeney, II et al. |
| 5,285,447 A | 2/1994 | Hulsebosch |
| 5,293,643 A | 3/1994 | Israelsson |

(Continued)

FOREIGN PATENT DOCUMENTS

| | | |
|---|---|---|
| CN | 1025102 | 11/1991 |
| CN | 1243647 | 2/2000 |

(Continued)

OTHER PUBLICATIONS

Sungjin Lee et al., "IEEE 802.16e HO Options for Forcing and Suggesting HO", Sep. 4, 2003.

(Continued)

*Primary Examiner* — Olumide T Ajibade Akonai
*Assistant Examiner* — Emem Stephen
(74) *Attorney, Agent, or Firm* — The Farrell Law Firm, P.C.

(57) ABSTRACT

Methods and apparatus are provided for performing a handover by a serving base station in a communication system. A handover request message is received from a mobile station. A first handover response message is transmitted to the mobile station. The first handover response message includes a list of at least one neighbor base station. A handover indication message including a value of a handover indication type field is received. The value is determined by the mobile station from among at least two values individually indicating at least one of a handover cancel and the handover rejection. The value representing the handover cancel indicates that the mobile station intends to cancel a handover procedure, and the value representing the handover rejection indicates that the mobile station intends to reject performing handover with any of the at least one neighbor base stations in the list.

20 Claims, 14 Drawing Sheets

U.S. PATENT DOCUMENTS

| | | | |
|---|---|---|---|
| 5,396,541 A | 3/1995 | Farwell et al. | |
| 5,432,843 A | 7/1995 | Bonta | |
| 5,491,834 A | 2/1996 | Chia | |
| 5,530,917 A | 6/1996 | Andersson et al. | |
| 5,613,205 A | 3/1997 | Dufour | |
| 5,940,761 A | 8/1999 | Tiedemann et al. | |
| 6,055,427 A | 4/2000 | Ojaniemi | |
| 6,161,015 A | 12/2000 | Birchler et al. | |
| 6,304,755 B1 * | 10/2001 | Tiedemann et al. | 455/437 |
| 6,493,555 B2 | 12/2002 | Saada et al. | |
| 6,516,193 B1 | 2/2003 | Salmela et al. | |
| 6,714,785 B1 | 3/2004 | Han | |
| 6,778,830 B1 | 8/2004 | Oizumi et al. | |
| 6,879,830 B1 | 4/2005 | Vollmer et al. | |
| 7,369,856 B2 | 5/2008 | Ovadia | |
| 2001/0021650 A1 | 9/2001 | Bilgic | |
| 2001/0024430 A1 | 9/2001 | Sekine et al. | |
| 2002/0107021 A1 | 8/2002 | Ishikawa et al. | |
| 2003/0153311 A1 | 8/2003 | Black | |

FOREIGN PATENT DOCUMENTS

| | | |
|---|---|---|
| CN | 1303575 | 7/2001 |
| JP | 09-135477 | 5/1997 |
| JP | 2001-128209 | 5/2001 |
| RU | 2159007 | 11/2000 |
| RU | 2211153 | 8/2003 |
| WO | WO 98/05175 | 2/1998 |
| WO | WO 98/30056 | 7/1998 |
| WO | WO 99/62278 | 12/1999 |
| WO | WO 01/39538 | 5/2001 |
| WO | WO 01/72081 | 9/2001 |

OTHER PUBLICATIONS

Kitroser, "Handoff/Sleep-Mode Changes", Jul. 15, 2003.
Changhoi Koo et al., "Comments on IEEE 802.16E Handoff Draft", IEEE 802.16 Broadband Wireless Access Working Group, Mar. 11, 2003.

* cited by examiner

METHOD FOR COMPULSORILY PERFORMING HANDOVER IN BROADBAND WIRELESS COMMUNICATION SYSTEM

PRIORITY

This is a continuation application of U.S. Pat. No. 8,112,088 U.S. application Ser. No. 12/493,911 filed Jun. 29, 2009, which is a continuation application of U.S. Pat. No. 7,877,093, U.S. application Ser. No. 10/932,515 Sep. 2, 2004 both of which claim priority to an application entitled "Method For Compulsorily Performing Handover In Broadband Wireless Communication System" filed in the Korean Intellectual Property Office on Sep. 4, 2003 and assigned Serial No. 10-2003-0061945, the contents which are incorporated herein by reference.

BACKGROUND OF THE INVENTION

1. Field of the Invention

The present invention relates to a broadband mobile communication system, and more particularly to a method for performing a handover in a broadband wireless communication system employing an orthogonal frequency division multiplexing (hereinafter, referred to as an OFDM) method and an orthogonal frequency division multiplexing access (hereinafter, referred to as an OFDMA) method.

2. Description of the Related Art

In the fourth generation (hereinafter, referred to as a 4G) communication system, which is the next generation communication system, research has been actively pursued to provide users with services having various quality of services (hereinafter, referred to as a QoSs) and supporting a transmission speed of about 100 Mbps. The current third generation (hereinafter, referred to as a 3G) communication system supports a transmission speed of about 384 kbps in an outdoor channel environment having a relatively unfavorable channel environment, and supports a transmission speed of 2 Mbps at maximum even in an indoor channel environment having a relatively favorable channel environment.

Meanwhile, wireless local area network (hereinafter, referred to as a LAN) system, and a wireless metropolitan area network (hereinafter, referred to as a MAN) systems generally support transmission speeds of 20 to 50 Mbps. Accordingly, in the current 4 G communication system, research has been actively pursued to develop a communication system to ensure mobility and QoS in the wireless LAN system and the wireless MAN system supporting relatively high transmission speeds, and to support a high speed service which will be provided by the 4 G communication system.

Since the wireless MAN system has a wide service coverage and supports a high transmission speed, it is suitable for supporting a high speed communication service. However, because the wireless MAN system is a system which does not completely consider the mobility of a subscriber station (SS), a handover due to the high-speed movement of a subscriber station is also not considered. Herein, the wireless MAN system is a broadband wireless access (BWA) communication system, and it has a service coverage area which is larger than that which the wireless LAN system provides and, additionally, supports a transmission speed higher than that which the wireless LAN system provides.

A system employing an OFDM method and an OFDMA method in order to enable a physical channel of the wireless MAN system to support a broadband transmission network is known as an IEEE (Institute of Electrical and Electronics Engineers) 802.16a communication system. The IEEE 802.16a communication system is a broadband wireless access communication system employing an OFDM/OFDMA method. Further, since the IEEE 802.16a communication system applies an OFDM/OFDMA method to the wireless MAN system, the IEEE 802.16a communication system transmits a physical channel signal using a plurality of sub-carriers, thereby enabling a high speed data transmission. Therefore, the IEEE 802.16a communication system is called a broadband wireless access communication system.

Hereinafter, the structure of the conventional IEEE 802.16a communication system will be descried with reference to FIG. 1.

FIG. 1 is a block diagram schematically showing the structure of the IEEE 802.16a communication system. The IEEE 802.16a communication system has a single cell structure and includes a base station (BS) 100 and a plurality of subscriber stations 110, 120, and 130 controlled by the base station 100. The transmission/reception of signals between the base station 100 and the subscriber stations 110, 120, and 130 are accomplished through the OFDM/OFDMA method.

Hereinafter, the structure of the downlink frame of the conventional IEEE 802.16a communication system will be descried with reference to FIG. 2 which is a view which illustrates the structure of the downlink frame of the IEEE 802.16a communication system.

Referring to FIG. 2, the downlink frame of the IEEE 802.16a communication system includes a preamble portion 200, a broadcast control portion 210, and a plurality of time division multiplex (hereinafter, referred to as a TDM) portions 220 and 230. A synchronization signal (i.e., preamble sequence) used in obtaining a mutual synchronization between a base station and a subscriber station is transmitted through the preamble portion 200. The broadcast control portion 210 includes a downlink (hereinafter, referred to as a DL) portion DL-MAP 211 and an uplink (hereinafter, referred to as an UL) portion UL-MAP 213. The DL_MAP portion 211 is a portion through which a DL_MAP message is transmitted. Table 1 shows information elements (hereinafter, referred to as IEs) contained in the DL_MAP message.

TABLE 1

| Syntax | Size | Notes |
|---|---|---|
| DL_MAP_Message_Format( ) { | | |
| Management Message Type=2 | 8 bits | |
| PHY Synchronization Field | Variable | See Appropriate PHY specification |
|     DCD Count | 8 bits | |
|     Base Station ID | 48 bits | |
|   Number of DL_MAP Element n | 16 bits | |
| Begin PHY specific section { | | See Applicable PHY section |
|   for (i=1; i<=n; i++) { | | For each DL_MAP element 1 to n |
| DL_MAP Information Element( ) | Variable | See corresponding PHY specification |
|   If!(byte boundary) { | 4 bits | Padding to reach byte boundary |
|     Padding Nibble | | |
|     } | | |
|   } | | |
|   } | | |
| } | | |

As shown in Table 1, the DL_MAP message includes a plurality of IEs, that is, the 'Management Message Type' representing the type of a transmitted message, the 'PHYsical (PHY) Synchronization' set according to a modulation method and a demodulation method applied to a physical channel in order to obtain a synchronization, the 'DCD count' representing a count corresponding to the configuration variation of a downlink channel descript (hereinafter, referred to as a DCD) message containing a downlink bust profile, the 'Base Station ID' representing a base station identifier (BSID), and the 'Number of DL_MAP Elements n' representing the number of elements existing after the Base Station ID. Especially, the DL_MAP message contains information on ranging codes assigned to each ranging which will be described later.

Further, the UL_MAP portion 213 is a portion through which an UL_MAP message is transmitted. Table 2 shown below illustrates IEs contained in the UL_MAP message.

TABLE 2

| Syntax | Size | Notes |
| --- | --- | --- |
| UL_MAP_Message_Format( ) { | | |
| Management Message Type=3 | 8 bits | |
| Uplink Channel ID | 8 bits | |
| UCD Count | 8 bits | |
| Number of UL_MAP Element n | 16 bits | |
| Allocation Start Time | 32 bits | |
| Begin PHY specific section { | | See Applicable PHY section |
| For (i=1; i<=n; i++) { | | For each UL_MAP element 1 to n |
| UL_MAP_Information_Element( ) | Variable | See corresponding PHY specification |
| } | | |
| } | | |
| } | | |

As shown in Table 2, the UL_MAP message includes a plurality of IEs, that is, the 'Management Message Type' representing the type of a transmitted message, the 'Uplink Channel ID' representing a used uplink channel identifier, the 'UCD count' representing a count corresponding to the configuration variation of an uplink channel descript (hereinafter, referred to as an UCD) message containing an uplink bust profile, and the 'Number of UL_MAP Elements n' representing the number of elements existing after the UCD count. Herein, the uplink channel identifier is uniquely assigned in a media access control (hereinafter, referred to as a MAC) sub-layer.

Further, the TDM portions 220 and 230 (as shown in FIG. 2) are portions corresponding to time slots assigned to each subscriber station by a time division multiplexing (hereinafter, referred to as a TDM) time division multiple access (hereinafter, referred to as a TDMA) TDM/TDMA method. The base station transmits broadcast information, which must be broadcasted, to subscriber stations managed by the base station through the DL_MAP portion 211 of the downlink frame by means of a preset center carrier. Then, each of the subscriber stations is powered on and the base station then monitors all frequency bands set in each of the subscriber stations in advance, and detects a pilot channel signal having the highest pilot carrier to interference and noise ratio (hereinafter, referred to as a CINR).

Also, the subscriber station determines a base station having transmitted the pilot channel signal having the highest CINR to be a base station to which the subscriber station currently belongs. Further, the subscriber station confirms the DL_MAP portion 211 and the UL_MAP portion 213 of the downlink frame transmitted by the base station, and confirms control information controlling an uplink and a downlink of the subscriber station and information representing an actual position of data transmission/reception.

Table 3, illustrated below, shows the structure of the UCD message.

TABLE 3

| Syntax | Size | Notes |
| --- | --- | --- |
| UCD-message_Format( ) { | | |
| Management Message Type=0 | 8 bits | |
| Uplink Channel ID | 8 bits | |
| Configuration Change Count | 8 bits | |
| Mini-slot size | 8 bits | |
| Ranging Backoff Start | 8 bits | |
| Ranging Backoff End | 8 bits | |
| Request Backoff Start | 8 bits | |
| Request Backoff End | 8 bits | |
| TLV Encoded Information for the overall channel | Variable | |
| Begin PHY Specific Section { | | |
| For(i=1; i<=n; I+n) { | | |
| Uplink_Burst_Descriptor | Variable | |
| } | | |
| } | | |
| } | | |

As shown in Table 3, the UCD message includes a plurality of IEs, that is, the 'Management Message Type' representing the type of a transmitted message, the 'Uplink Channel ID' representing a used uplink channel identifier, the 'Configuration Change Count' counted by a base station, the 'Mini-slot Size' representing the size of a mini-slot of an uplink physical channel, the 'Ranging Backoff Start' representing a start point of a backoff using an initial ranging, that is, the size of an initial backoff window using an initial ranging, the 'Ranging Backoff End representing an end point of a backoff using an initial ranging, that is, the size of a final backoff window, the 'Request Backoff Start' representing a start point of a backoff for 'contention data and requests', that is, the size of an initial backoff window, and the 'Request Backoff End representing an end point of a backoff for 'contention data and requests', that is, the size of a final backoff window.

Herein, the value of the backoff represents a kind of waiting time value for which a subscriber station must wait for the next ranging when failure occurs in rangings which will be described later. Further, a base station must transmit the backoff value, which is information on a time period for which the subscriber station must wait for the next ranging, to the subscriber station when the subscriber station fails in a ranging. For instance, when a value by the Ranging Backoff Start and the Ranging Backoff End is set to be 10, the subscriber station passes a chance in which the subscriber station can perform rangings of $2^{10}$ times (i.e., 1024 times) and then must perform the next ranging.

Hereinafter, the structure of the uplink frame of the conventional IEEE 802.16a communication system will be descried with reference to FIG. 3, which is a view which illustrates the structure of the uplink frame of the IEEE 802.16a communication system.

Before describing FIG. 3, rangings as described and used in the IEEE 802.16a communication system, include, an initial ranging, a maintenance ranging, that is, a periodic ranging, and a bandwidth request ranging each of which will be described in detail below.

The initial ranging is a ranging which is performed when a base station requests the initial ranging in order to obtain a synchronization with a subscriber station. Further, the initial ranging is a ranging which is performed in order to match an exact time offset between the subscriber station and the base station and adjust the transmit power. That is, the subscriber station is powered on, receives a DL_MAP message, an UL_MAP message, and a UCD message, and obtains synchronization with the base station. Then, the subscriber station performs the initial ranging to adjust the time offset and the transmit power with the base station. The base station receives the MAC address of the subscriber station from the subscriber station through the initial ranging procedure. Further, the base station generates a basic connection ID (hereinafter, referred to as a basic CID) and a primary management connection ID (hereinafter, referred to as a primary management CID) mapped with the received MAC address of the subscriber station, and then transmits the generated basic CID and the primary management CID to the subscriber station. Then, the subscriber station recognizes the basic CID and the primary management CID of the subscriber station through the initial ranging procedure.

Herein, since the IEEE 802.16a communication system employs an OFDM/OFDMA method, the ranging procedure requires ranging sub-channels and ranging codes. A base station assigns usable raging codes (RCs) according to the object of a raging, that is, the kind of a raging. This will be described in detail.

The raging code is generated by segmenting pseudo-random noise (hereinafter, referred to as a PN) sequence having a predetermined length (e.g., length of $2^{15}-1$ bits) by a predetermined unit. Generally, two sub-channels having a length of 53 bits constitute one ranging channel. Further, the raging code is constructed by segmenting a PN code through the ranging channel having a length of 106 bits. The 48 raging codes i.e., RC#1 to RC#48) (at maximum for 48 ranging codes per subscriber station) constructed in this way may be assigned to a subscriber station, and two raging codes (at minimum per a subscriber station) are applied to the three types of rangings, that is, the initial ranging, the periodic ranging and the bandwidth request ranging, according to a default value. In this way, different raging codes are assigned to each ranging. For instance, N number of raging codes are assigned for the initial ranging (N RCs for initial ranging), M number of raging codes are assigned for the periodic ranging (M RCs for periodic ranging), and L number of raging codes are assigned for the bandwidth request ranging (L RCs for BW-request ranging). The raging codes assigned in this way are transmitted to subscriber stations through the DL_MAP message as described above, and the subscriber stations perform the ranging procedure by using the raging codes contained in the DL_MAP message according to the objects of the raging code.

The periodic ranging is a ranging periodically performed when the subscriber station having adjusted the time offset and the transmit power with the base station through the initial ranging adjusts a channel status, etc., with the base station. The subscriber station performs the periodic ranging by means of the ranging codes assigned for the periodic ranging.

The bandwidth request ranging is a ranging performed when the subscriber station having adjusted the time offset and the transmit power with the base station through the initial ranging requests a bandwidth assignment in order to actually perform a communication with the base station.

Referring to FIG. 3, the uplink frame includes an 'Initial Maintenance Opportunities' portion 300 using the initial ranging, and the maintenance ranging, that is, the periodic ranging, a 'Request Contention Opportunities' portion 310 using the bandwidth request ranging, and a 'SS scheduled data' portion 320 containing the uplink data of subscriber stations. The Initial Maintenance Opportunities portion 300 includes a plurality of access burst intervals actually containing an initial ranging and a periodic ranging, and a collision interval in which collision between access burst intervals occurs. The Request Contention Opportunities portion 310 includes a plurality of bandwidth request intervals containing a bandwidth request ranging, and a collision interval in which collision between bandwidth request intervals occurs. Further, the SS scheduled data portion 320 includes a plurality of SS scheduled data parts (i.e., SS 1 scheduled data part to SS N scheduled data part) and a subscriber station transition gap which is present in each of the SS scheduled data parts.

An uplink interval usage code (hereinafter, referred to as a UIUC) portion which is a portion in which information designating the use of an offset recorded in an offset portion is recorded. Table 4 below shows the UIUC portion.

TABLE 4

| IE name | UIUC | Connection ID | Description |
|---|---|---|---|
| Reserved | 0 | NA | Reserved for future use |
| Request | 1 | any | Starting offset of request region |
| Initial Maintenance | 2 | broadcast | Starting offset of maintenance region (used in Initial Ranging) |
| Station Maintenance | 3 | unicast | Starting offset of maintenance region (used in periodic Ranging) |
| Data Grant Burst Type 1 | 4 | unicast | Starting offset of Data Grant Burst Type 1 assignment |
| Data Grant Burst Type 2 | 5 | unicast | Starting offset of Data Grant Burst Type 2 assignment |
| Data Grant Burst Type 3 | 6 | unicast | Starting offset of Data Grant Burst Type 3 assignment |
| Data Grant Burst Type 4 | 7 | unicast | Starting offset of Data Grant Burst Type 4 assignment |
| Data Grant Burst Type 5 | 8 | unicast | Starting offset of Data Grant Burst Type 5 assignment |
| Data Grant Burst Type 6 | 9 | unicast | Starting offset of Data Grant Burst Type 6 assignment |
| Null IE | 10 | zero | Ending offset of the previous grant. Used to bound the length of the last actual interval allocation |
| Empty | 11 | zero | Used to schedule gaps in transmission |
| Reserved | 12 to 15 | N/A | Reserved |

As shown in Table 4, the UIUC portion contains information designating the use of the offset recorded in the offset portion. For instance, when a value of 2 is recorded in the UIUC portion, it signifies that a starting offset used in the initial ranging is recorded in the offset portion. When a value of 3 is recorded in the URIC portion, it signifies that a starting offset used in the maintenance ranging or the bandwidth request ranging is recorded in the offset portion. As described above, the offset portion is a portion recording a starting offset value used in the initial ranging, the bandwidth request ranging, or the maintenance ranging according to the information recorded in the UIUC portion. Further, information on a characteristic of a physical channel to be transmitted in the URIC portion is recorded in the UCD message.

Hereinafter, a ranging process between a base station and a subscriber station in the conventional IEEE 802.16a communication system will be descried with reference to FIG. 4 which is a flow diagram illustrating the ranging process between the base station and the subscriber station in the IEEE 802.16a communication system.

Referring to FIG. 4, the subscriber station 400 is powered on, monitors all frequency bands set in the subscriber station 400 in advance, and detects a pilot channel signal having the highest CINR. Also, the subscriber station 400 determines a base station 420 having transmitted the pilot channel signal having the highest CINR to be the base station 420 to which the subscriber station 400 currently belongs. Then, the subscriber station 400 receives the preamble of the downlink frame transmitted from the base station 420 and obtains a system synchronization with the base station 420.

As described above, when the system synchronization is obtained between the subscriber station 400 and the base station 420, the base station 420 transmits a DL_MAP message and an UL_MAP message to the subscriber station 400 in steps 411 and 413, respectively. Herein, as described in Table 1, the DL_MAP message performs the function of informing the subscriber station 400 of information required when the subscriber station 400 obtains a synchronization with respect to the base station 420 in a downlink, and information on the structure of a physical channel capable of receiving messages transmitted to the subscriber station 400 in the downlink. Further, as described in table 2, the UL_MAP message performs the function of informing the subscriber station 400 of information on the scheduling period of a subscriber station and the structure of a physical channel in an uplink.

Meanwhile, the DL_MAP message is broadcasted from a base station to all subscriber stations. Herein, a case in which a certain subscriber station can continuously receive the DL_MAP message signifies that the subscriber station has synchronized with the base station. That is, the subscriber stations having received the DL_MAP message can receive all messages transmitted through a downlink. Further, as described in Table 2, when the subscriber station fails in an access, the base station transmits the UCD message containing information notifying an usable backoff value to the subscriber station.

Meanwhile, when the subscriber station 400 having synchronized with the base station 420 performs the ranging, the subscriber station 400 transmits a ranging request (hereinafter, referred to as a RNG_REQ) message to the base station 420 in step 415. Then, in step 417, the base station 420 having received the RNG_REQ message transmits a ranging response (hereinafter, referred to as a RNG_RSP) message, which contains information referred for compensating for frequency, time, and transmit power for the ranging, to the subscriber station 400.

Table 5 illustrated below, shows the structure of the RNG_REQ message.

TABLE 5

| Syntax | Size | Notes |
| --- | --- | --- |
| RNG_REQ_message_Format( ) { | | |
| Management Message Type=4 | 8 bits | |
| Downlink Channel ID | 8 bits | |
| Pending Until Complete | 8 bits | |
| TLV Encoded Information | Variable | TLV specific |
| } | | |

As shown in Table 5, the 'Downlink Channel ID' represents a downlink channel identifier contained in the RNG_REQ message received in the subscriber station 400 through the UCD. The 'Pending Until Complete' represents a priority of a transmitted ranging response. That is, when the Pending Until Complete has a value of 0, a previous ranging response has a high priority. In contrast, when the Pending Until Complete has values other than 0, a currently transmitted ranging response has a high priority.

Table 6 illustrated below, shows the structure of the RNG_RSP message corresponding to the RNG_REQ message shown in Table 5.

TABLE 6

| Syntax | Size | Notes |
| --- | --- | --- |
| RNG_RSP_message_Format( ) { | | |
| Management Message Type=5 | 8 bits | |

TABLE 6-continued

| Syntax | Size | Notes |
| --- | --- | --- |
| Uplink Channel ID | 8 bits | |
| TLV Encoded Information | Variable | TLV specific |
| } | | |

As shown in Table 6, the 'Uplink Channel ID' represents an uplink channel identifier contained in the RNG_REQ message. Meanwhile, in FIG. 4, since the IEEE 802.16a communication system considers only a state in which a subscriber station is currently motionless, that is, it does not entirely consider the mobility of the subscriber station, the base station 420 (as shown in FIG. 4) communicating with the subscriber station 400 unconditionally becomes a serving base station.

As described above, the IEEE 802.16a communication system considers only a state in which a subscriber station is currently motionless (i.e., a state in which the mobility of the subscriber station is not entirely considered), and a single cell structure. However, an IEEE 802.16e communication system is stipulated as a system considering the mobility of a subscriber station in the IEEE 802.16a communication system. Accordingly, the IEEE 802.16e communication system must consider the mobility of a subscriber station in a multi-cell environment. In order to support the mobility of the subscriber station in a multi-cell environment, changes in operations of the subscriber station and a base station are necessarily required. Especially, in order to support the mobility of the subscriber station, research into a handover of the subscriber station considering a multi-cell structure has been actively pursued.

Hereinafter, the structure of the conventional IEEE 802.16e communication system will be described with reference to FIG. 5.

FIG. 5 is a block diagram schematically showing the structure of the IEEE 802.16e communication system.

Referring to FIG. 5, the IEEE 802.16e communication system has a multi-cell structure, that is, a cell 500 and a cell 550. Further, the IEEE 802.16a communication system includes a base station 510 controlling the cell 500, a base station 540 controlling the cell 550, and a plurality of mobile subscriber stations (MSSs) 511, 513, 530, 551, and 553. The transmission/reception of signals between the base stations 510 and 540 and the mobile subscriber stations 511, 513, 530, 551, and 553 is accomplished through an OFDM/OFDMA method. Herein, the mobile subscriber station 530 (of the mobile subscriber stations 511, 513, 530, 551, and 553) exists in an overlapping area (i.e., handover area) between the cell 500 and the cell 550. Accordingly, only when a handover for the mobile subscriber station 530 must be supported, it is possible to support the mobility for the mobile subscriber station 530.

In the IEEE 802.16e communication system, a certain mobile subscriber station receives pilot channel signals transmitted from a plurality of base stations, and measures CINRs of the received pilot channel signals. The mobile subscriber station then selects a base station, which is the base station that has transmitted a pilot channel signal having the highest CINR from among the measured CINRs of the pilot channel signals, as a base station to which the mobile subscriber station currently belongs. That is, the mobile subscriber station recognizes a base station, which transmits a pilot channel signal capable of being favorably received in the mobile subscriber station, from among base stations having transmitted pilot channel signals as a base station to which the mobile subscriber station belongs. As a result, the base station to which the mobile subscriber station currently belongs becomes a serving base station. The mobile subscriber station having selected the serving base station receives a downlink frame and an uplink frame transmitted from the serving base station. Herein, the downlink frame and the uplink frame of the IEEE 802.16e communication system have the same structures as those of the downlink frame and the uplink frame of the IEEE 802.16a communication system shown in FIGS. 2 and 3 above and described herein.

The serving base station transmits a mobile subscriber station neighbor advertisement (hereinafter, referred to as a MOB_NBR_ADV) message to the mobile subscriber station. Table 7 illustrated below shows the structure of the MOB_NBR_ADV message.

TABLE 7

| Syntax | Size | Notes |
|---|---|---|
| MOB_NBR_ADV_message_Format( ) { | | |
| Management Message Type=48 | 8 bits | |
| Configuration Change Count | 8 bits | |
| N_NEIGHBORS | 8 bits | |
| For (j=0;j< N_NEIGHBORS;J++){ | | |
| Neighbor BS-ID | 48 bits | |
| Physical Frequency | 32 bits | |
| TLV Encoded Neighbor Information | Variable | TLV specific |
| } | | |
| } | | |

As shown in Table 7, the MOB_NBR_ADV message includes a plurality of IEs, that is, the 'Management Message Type' representing the type of a transmitted message, the 'Configuration Change Count' representing the number of times by which a Configuration changes, the 'N_NEIGHBORS' representing the number of neighbor base stations, the 'Neighbor BS-ID' representing identifiers (ID) of the neighbor base stations, the 'Physical Frequency' representing the physical frequency of the neighbor base station, and the 'TLV Encoded Neighbor Information' representing extra information relating to the neighbor base station in addition to the information.

The mobile subscriber station having received the MOB_NBR_ADV message transmits a mobile subscriber station scanning interval allocation request (hereinafter, referred to as a MOB_SCN_REQ) message to the serving base station when the mobile subscriber station intends to scan the CINRs of pilot channel signals transmitted from neighbor base stations. Herein, since a time point at which the mobile subscriber station requests a scanning has no direct relation to a scanning operation for the CINR of the pilot channel signal, a detailed description about the time point will be omitted.

Table 8 illustrated below shows the structure of the MOB_SCN_REQ message.

TABLE 8

| Syntax | Size | Notes |
|---|---|---|
| MOB_SCN_REQ_message_Format( ) { | | |
| Management Message Type=? | 8 bits | |
| Scan Duration | 16 bits | Units are frames |
| } | | |

As shown in Table 8, the MOB_SCN_REQ message includes a plurality of IEs, that is, the 'Management Message Type' representing the type of a transmitted message and the 'Scan Duration' representing a scan duration for which mobile subscriber station scans the CINRs of the pilot channel signals transmitted from the neighbor base stations. The 'Scan Duration' is constructed by the frame. Herein, the 'Management Message Type' of the MOB_SCN_REQ message to be transmitted has not been defined yet (i.e., Management Message Type=undefined or "?" as is shown in the table to conserve space).

Meanwhile, the serving base station having received the MOB_SCN_REQ message transmits a mobile subscriber station scanning interval allocation response (hereinafter, referred to as a MOB_SCN_RSP) message, which contains information to be scanned by the mobile subscriber station, to the mobile subscriber station. Table 9 illustrated below shows the structure of the MOB_SCN_RSP message.

TABLE 9

| Syntax | Size | Notes |
|---|---|---|
| MOB_SCN_RSP_message_Format( ) { | | |
| Management Message Type=? | 8 bits | |
| Length | 8 bits | in bytes |
| For(I=0;i<Length/3;i++){ | | |
| CID | 16 bits | basic CID of the MSS |
| Duration | 8 bits | in frames |
| } | | |
| } | | |

As shown in Table 9, the MOB_SCN_RSP message includes a plurality of IEs, that is, the 'Management Message Type' representing the type of a transmitted message, the connection ID (hereinafter, referred to as a CID) of the mobile subscriber station having transmitted the MOB_SCN_REQ message, and a scan duration. In Table 9, the 'Management Message Type' of the MOB_SCN_RSP message to be transmitted has not been defined yet (i.e., Management Message Type=undefined), and the scan duration is a duration for which the mobile subscriber station performs the pilot CINR scanning. The mobile subscriber station having received the MOB_SCN_RSP message containing the scanning information scans pilot CINRs for neighbor base stations, which has been recognized through the MOB_NBR_ADV message, according to the scanning information parameters.

In order to support a handover in the IEEE 802.16e communication system, a mobile subscriber station must measure CINRs of pilot channel signals transmitted from neighbor base stations and a base station (i.e., serving base station) to which the mobile subscriber station currently belongs. Further, when the CINR of the pilot channel signal transmitted from the serving base station is smaller than the CINRs of the pilot channel signals transmitted from the neighbor base stations, the mobile subscriber station requests a handover from the serving base station. Herein, for convenience of description, the sentence 'measure the CINR of the pilot channel signal' may be expressed by a sentence 'scan or perform a scanning for the CINR of the pilot channel signal'. Also, the words 'scan' and 'scanning' have the same concept; 'scan' is used together with 'scanning' for convenience of description.

Hereinafter, a handover process by the request of a mobile subscriber station in the conventional IEEE 802.16e communication system will be descried with reference to FIG. 6.

FIG. 6 is a flow diagram illustrating the handover process by the request of the mobile subscriber station in the conventional IEEE 802.16e communication system.

Referring to FIG. 6, first, a serving base station 640 transmits a MOB_NBR_ADV message to a mobile subscriber station 600 in step 611. Then, the mobile subscriber station 600 receives the MOB_NBR_ADV message and obtains information on neighbor base stations. Further, in step 613, the mobile subscriber station 600 transmits a MOB_SCN_REQ message to the serving base station 640 when the mobile subscriber station 600 intends to scan the CINRs of pilot channel signals transmitted from the neighbor base stations. Herein, since a time point at which the mobile subscriber station 600 requests a scanning has no direct relation to a scanning operation for the CINR of the pilot channel signal, a detailed description about the time point will be omitted. Meanwhile, in step 615, the serving base station 640 having received the MOB_SCN_REQ message transmits the MOB_SCN_RSP message, which contains information to be scanned by the mobile subscriber station 600, to the mobile subscriber station 600. In step 617, the mobile subscriber station 600 having received the MOB_SCN_RSP message containing the scanning information performs a scanning for the CINRs of pilot channel signals with respect to neighbor base stations, which have been recognized through the reception of the MOB_NBR_ADV message, according to parameters (i.e., scan duration) contained in the MOB_SCN_RSP message.

Next, after having completely scanned the CINRs of the pilot channel signals received from the neighbor base stations, when the mobile subscriber station 600 determines to change the serving base station 640 to which the mobile subscriber station 600 currently belongs in step 619, that is, the mobile subscriber station 600 determines to change the current serving base station 640 to another new base station, the mobile subscriber station 600 transmits a mobile subscriber station handover request (hereinafter, referred to as a MOB_MSSHO_REQ) message to the serving base station 640 in step 621. Herein, a new base station (i.e., a base station to which the mobile subscriber station 600 is to be handed over), which is not a serving base station to which the mobile subscriber station 600 currently belongs, is called a target base station (target BS). Table 10 shows the structure of the MOB_MSSHO_REQ message and is illustrated below.

TABLE 10

| Syntax | Size | Notes |
|---|---|---|
| MOB_MSSHO_REQ_message_Format( ) { | | |
| Management Message Type=52 | 8 bits | |
| N_Recommended | 8 bits | |
| For (j=0;j< N_NEIGHBORS;J++){ | | |
| Neighbor BS-ID | 48 bits | |
| BS S/(N+1) | 8 bits | |
| Service level prediction | 8 bits | |
| } | | |
| } | | |

As shown in Table 10, the MOB_MSSHO_REQ message includes a plurality of IEs, that is, the 'Management Message Type' representing the type of a transmitted message, and the 'N_Recommended' representing a result obtained by a scanning of a mobile subscriber station. Herein, as shown in Table 10, the 'N_Recommended' contains the identifiers of neighbor base stations, a CINR of a pilot channel signal for each of the neighbor base stations, and the level of a service predicted to be provided from the neighbor base stations to the mobile subscriber station.

Meanwhile, when the serving base station 640 receives the MOB_MSSHO_REQ message transmitted from the mobile subscriber station 600, the serving base station 640 detects a list of target base stations to which the mobile subscriber station 600 can be handed over by means of the 'N_Recommended' information of the received MOB_MSSHO_REQ message in step 623. Herein, for convenience of description, the list of target base stations to which the mobile subscriber station 600 can be handed over will be called a 'handover-executable target base station list'. In FIG. 6, it is assumed that a first target base station 660 and a second target base station 680 exist in the handover-executable target base station list. Also, the handover-executable target base station list may include a plurality of target base stations. In steps 625 and 627, the serving base station 640 transmits a handover notifications (hereinafter, referred to as HO_notifications) message to the target base stations (i.e., the first target base station 660 and the second target base station 680) contained in the handover-executable target base station list. Table 11 shows the structure of the HO_notification message and illustrated below.

TABLE 11

| Syntax | Size | Notes |
|---|---|---|
| Global Header | 152-bit | |
| For (j=0;j< Num Records;J++){ | | |
| MSS unique identifier | 48-bit | 48-bit unique identifier used by MSS (as provided by the MSS or by the I-am-host-of message) |
| Estimated Time to HO | 16-bit | In milliseconds, relative to the time stamp, value 0 of this parameter indicates that no actual HO is pending |
| Required BW | 8-bit | Bandwidth which is required by MSS (to guarantee minimum packet data transmission) |
| Required QoS | 8-bit | Name of Service Class representing Authorized QoSparamSet |
| } | | |
| Security field | TBD | A means to authenticate this message |
| CRC field | 32-bit | IEEE CRC-32 |

As shown in Table 11, the HO_notification message includes a plurality of IEs, that is, an identifier MSS ID of the mobile subscriber station 600 intending to perform a handover procedure to the first target base station 660 or the second target base station 680, an estimated start time of a handover by the mobile subscriber station 600, and information on the bandwidth requested from the mobile subscriber station 600 to a target base station which will become the new serving base station, and the level of a service that is to be provided to the mobile subscriber station 600. Herein, the bandwidth and the service level requested by the mobile subscriber station 600 are identical to the predicted service level information recorded in the MOB_MSSHO-REQ message described in Table 10 above.

Meanwhile, when the first target base station 660 or the second target base station 680 receive the HO_notification messages from the serving base station 640, they each transmit handover notification response (hereinafter, referred to as a HO_notification_response) messages, response messages with respect to the HO_notification message, to the serving base station 640 in steps 629 and 631, respectively. Table 12 shows the structure of the HO_notification_response message and is illustrated below.

TABLE 12

| Syntax | Size | Notes |
|---|---|---|
| Global Header | 152-bit | |
| For (j=0;j< Num Records;J++){ | | |
| MSS unique identifier | 48-bit | 48-bit unique identifier |

TABLE 12-continued

| Syntax | Size | Notes |
|---|---|---|
| | | used by MSS (as provided by the MSS or by the I-am-host-of message) |
| QoS Estimated | 8-bit | Bandwidth which is provided by BS(to guarantee minimum packet data transmission)TBD how to set this field |
| BW Estimated | 8-bit | Quality of Service level Unsolicited Grant Service (UGS) Real-time polling Service (rtPS) Non-Real-time polling Service nrtPS) Best effort |
| ACK/NACK | 1-bit | Acknowledgement or Negative acknowledgement 1 is Acknowledgement which means that the neighbor BS accepts the HO_notification message from the serving BS 0 is Negative Acknowledgement which means that the neighbor BS may not accept the HO_notification message from the serving BS |
| } | | |
| Security field | TBD | A means to authenticate this message |
| CRC field | 32-bit | IEEE CRC-32 |

As shown in Table 12, the HO_notification_response message includes a plurality of IEs, that is, an identifier MSS ID (MSS unique identifier) of a mobile subscriber station intending to perform a handover procedure to target base stations, a response ACK/NACK regarding whether or not the target base stations can perform a handover according to the handover request of the mobile subscriber station, and bandwidth and service level information capable of being provided by each target base station when the mobile subscriber station is handed over to each target base station.

Meanwhile, the serving base station 640 having received the HO_notification_response messages from the first target base station 660 and the second target base station 680 analyzes the received HO_notification_response message, and selects a target base station, which can optimally provide the bandwidth and the service level requested by the mobile subscriber station 600 when the mobile subscriber station 600 is handed over, as a final target base station to which the mobile subscriber station 600 is to be handed over. For instance, when it is assumed that the service level capable of being provided by the first target base station 660 is smaller that that requested by the mobile subscriber station 600, and the service level capable of being provided by the second target base station 680 is identical to that requested by the mobile subscriber station 600, the serving base station 640 selects the second target base station 680 as a final target base station to which the mobile subscriber station 600 is to be handed over. Accordingly, the serving base station 640 transmits a handover notification confirmation (hereinafter, referred to as a HO_notification_confirm) message, a response message with respect to the HO_notification_response message, to the second target base station 680 in step 633. Table 13 shows the structure of the HO_notification_confirm message and is illustrated below.

TABLE 13

| Syntax | Size | Notes |
|---|---|---|
| Global Header | 152-bit | |
| For (j=0;j< Num Records;J++){ | | |
| MSS unique identifier | 48-bit | 48-bit universal MAC address of the MSS (as provided to the BS on the RNG-REQ message) |
| QoS Estimated | 8-bit | Bandwidth which is provided by BS(to guarantee minimum packet data transmission)TBD how to set this field |
| BW Estimated | 8-bit | Quality of Service level Unsolicited Grant Service (UGS) Real-time polling Service (rtPS) Non-Real-time polling Service (nrtPS) Best effort |
| } | | |
| Security field | TBD | A means to authenticate this message |
| CRC field | 32-bit | IEEE CRC-32 |

As shown in Table 13, the HO_notification_confirm message includes a plurality of IEs, that is, an identifier MSS ID (MSS unique identifier) of a mobile subscriber station intending to perform a handover procedure to a selected target base station, and bandwidth and service level information capable of being provided by the selected target base station when the mobile subscriber station is handed over to the selected target base station.

Also, the serving base station 640 transmits a mobile subscriber station handover response (hereinafter, referred to as a MOB_HO_RSP) message, a response message with respect to the MOB_MSSHO_REQ message, to the mobile subscriber station 600 in step 635. Herein, the MOB_HO_RSP message contains information on a target base station to which the mobile subscriber station 600 is to be handed over. Table 14 illustrated below, shows the structure of the MOB_HO_RSP message.

TABLE 14

| Syntax | Size | Notes |
|---|---|---|
| MOB_HO_RSP_message_Format( ) { | | |
| Management Message Type=53 | 8 bits | |
| Estimated HO time | 8 bits | |
| N_Recommended | 8 bits | |
| For (j=0;j< N_NEIGHBORS;J++){ | | |
| Neighbor BS-ID | 48 bits | |
| Service level prediction | 8 bits | This parameter exists only when the message is sent by the BS |
| } | | |
| } | | |

As shown in Table 14, the MOB_HO_RSP message includes a plurality of IEs, that is, the 'Management Message Type' representing the type of a transmitted message, an estimated start time of a handover procedure, and the 'N_Recommended' representing a result for target base stations selected by a serving base station. Herein, as shown in Table 14, the 'N_Recommended' contains identifiers of the selected target base stations and the level of a service predicted to be provided from each target base station to a mobile subscriber station. In FIG. 6, the MOB_HO_RSP message finally includes only target base station information on the second target base station 680 from among target base stations existing in the handover-executable target base station list. However, when there exist a plurality of target base stations capable of providing bandwidth and service level requested by the mobile subscriber station 600 from among the target base stations existing in the handover-executable target base station list, the MOB_HO_RSP message includes information on the plurality of target base stations.

Next, the mobile subscriber station 600 having received the MOB_HO_RSP message analyzes the 'N_Recommended' information contained in the MOB_HO_RSP message and selects a target base station to which the mobile subscriber station 600 is to be handed over. Then, the mobile subscriber station 600 having selected the target base station to which the mobile subscriber station 600 is to be handed over transmits a mobile subscriber station handover indication (hereinafter, referred to as a MOB_HO_IND) message, a response message with respect to the MOB_HO_RSP message, to the serving base station 640 in step 637. Table 15 illustrated below, shows the structure of the MOB_HO_IND message.

TABLE 15

| Syntax | Size | Notes |
|---|---|---|
| MOB_HO_IND_message_Format( ) { | | |
| Management Message Type=54 | 8 bits | |
| TLV Encoded Information | Variable | TLV specific |
| Target_BS_ID | 48 bits | |
| } | | |

As shown in Table 15, the MOB_HO_ND message includes a plurality of IEs, that is, the 'Management Message Type' representing the type of a transmitted message, the 'Target_BS_ID' representing an identifier of a target base station selected by a mobile subscriber station, and the 'TLV Encoded Information' representing extra information in addition to the information.

Meanwhile, in step 639, the serving base station 640 having received the MOB_HO_ND message recognizes that the mobile subscriber station 600 is handed over to the target base station (i.e., the second target base station 680) contained in the MOB_HO_IND message, and then releases a link currently setup with the mobile subscriber station 600. In this way, when the link with the serving base station 640 is released, the mobile subscriber station 600 performs a handover procedure to the second target base station 680 in step 641.

Hereinafter, a handover process by the request of a base station in the conventional IEEE 802.16e communication system will be described with reference to FIG. 7.

FIG. 7 is a flow diagram illustrating the handover process by the request of the base station in the conventional IEEE 802.16e communication system.

Before describing FIG. 7, the handover process by the request of the base station occurs when the base station is overloaded and requires some type of load-sharing for dispersing the load of the base station, or the base station must cope with the change of the uplink status of a mobile subscriber station.

Referring to FIG. 7, first, a serving base station 740 transmits a MOB_NBR_ADV message to a mobile subscriber station 700 in step 711. Then, the mobile subscriber station 700 receives the MOB_NBR_ADV message and obtains information on neighbor base stations. Further, in step 713, the mobile subscriber station 700 transmits a MOB_SCN_REQ message to the serving base station 740 when the mobile subscriber station 700 intends to scan the CINRs of pilot channel signals transmitted from the neighbor base stations.

Herein, since a time point at which the mobile subscriber station 700 requests a scanning has no direct relation to a scanning operation for the CINR of the pilot channel signal, a detailed description about the time point will be omitted. In step 715, the serving base station 740 having received the MOB_SCN_REQ message transmits the MOB_SCN_RSP message, which contains information to be scanned by the mobile subscriber station 700, to the mobile subscriber station 700. In step 717, the mobile subscriber station 700 having received the MOB_SCN_RSP message containing the scanning information performs a CINR scanning of pilot channel signals with respect to neighbor base stations, which has been recognized through the reception of the MOB_NBR_ADV message, according to parameters (i.e., scan duration) contained in the MOB_SCN_RSP message.

Meanwhile, when the mobile subscriber station 700 managed by the serving base station 740 determines to perform a handover procedure by its own handover necessity in step 719, the serving base station 740 transmits the HO_notification messages to neighbor base stations 760 an 780 in steps 721 and 723. Herein, the HO_notification message contains information on a bandwidth and the level of a service which must be provided by a target base station to be a new serving base station of the mobile subscriber station 700. In FIG. 7, it is assumed that the neighbor base stations of the serving base station 740 are two base stations, that is, the first target base station 760 and the second target base station 780.

In steps 725 and 727, the first target base station 760 and the second target base station 780 receive the HO_notification messages respectively, and transmit the HO_notification_response messages, response messages for the HO_notification messages, to the serving base station 740. As described in Table 12, the HO_notification_response message contains a response ACK/NACK regarding whether or not the target base stations can perform a handover procedure requested by the serving base station 740, and bandwidth and service level information capable of being provided to the mobile subscriber station 700.

Next, after receiving the HO_notification_response messages from the first target base station 760 and the second target base station 780, the serving base station 740 then selects target base stations capable of providing the bandwidth and the service level requested by the mobile subscriber station 700. For instance, when it is assumed that the service level capable of being provided by the first target base station 760 is smaller than that requested by the mobile subscriber station 700, and the service level capable of being provided by the second target base station 780 is identical to that requested by the mobile subscriber station 700, the serving base station 740 selects the second target base station 780 as a final target base station to which the mobile subscriber station 700 is to be handed over. Further, the serving base station 740 having selected the second target base station 780 as the final target base station transmits a HO_notification_confirm message, which is a response message for the HO_notification_response message in step 729.

Next, after transmitting the HO_notification_confirm message to the second target base station 780, the serving base station 740 transmits a MOB_HO_RSP message to the mobile subscriber station 700 in step 731. Herein, the MOB_HO_RSP message contains N_Recommended information selected by the serving base station 740, that is, selected target base stations e.g., in FIG. 7, the second target base station 780) and the bandwidth and the service level capable of being provided from the target base stations to the mobile subscriber station 700. The mobile subscriber station 700 having received the MOB_HO_RSP message recognizes the a handover has been requested by the serving base station 740, and selects a final target base station to which the mobile subscriber station 700 is to be handed over with reference to the N_Recommended information contained in the MOB_HO_RSP message. After selecting the final target base station, the mobile subscriber station 700 transmits a MOB_HO_IND message, a response message for the MOB_HO_RSP message, to the serving base station 740 in step 733. Then, in step 735, the serving base station 740 having received MOB_HO_IND message recognizes that the mobile subscriber station 700 is to be handed over to the target base station contained in the MOB_HO_IND message, and then releases a link currently setup with the mobile subscriber station 700. In this way, when the link with the serving base station 740 is released, the mobile subscriber station 700 performs a handover procedure to the second target base station 780 in step 737.

As described above, in the currently proposed handover procedure in the IEEE 802.16e communication system, a serving base station collects information of neighbor base stations, transmits a HO_notification message, and collects information necessary for the handover. Then, the serving base station receives a HO_notification_response message as a response of the HO_notification message, and transmits a MOB_HO_RSP message containing information of target base stations to which a mobile subscriber station can be handed over to the corresponding mobile subscriber station. Meanwhile, the mobile subscriber station determines a base station to which the mobile subscriber station is to be handed over from a list of target base stations, to which the mobile subscriber station can be handed over, contained in the MOB_HO_RSP message, and then transmits a MOB_HO_IND message containing information on the determined base station to the serving base station. Then, the mobile subscriber station releases a current connection with the serving base and tries to connect with the determined base station.

As described above, only a simple procedure for a handover is defined up to now. However, various circumstances may exist which have been not described in the procedure in a broadband mobile communication service of actual various radio environments. For instance, there may occur a case in which the serving base station must forcedly cause the subscriber station to perform a handover procedure according to the resource condition of the serving base station, or special circumstances such as the rejection of the subscriber station for a handover requested by the serving base station. Also, there may occur a case in which the movement direction of the subscriber station changes while being handed over to a target base station, and the subscriber station must cancel the handover procedure in order to connect to an original serving base station again.

However, the conventional broadband mobile communication system has not yet presented methods for solving the circumstances which may occur as described above. Additionally, when the conventional method is applied to the aforementioned circumstances, it is ineffective and further, the performance of the system may be substantially reduced.

SUMMARY OF THE INVENTION

Accordingly, the present invention has been made to solve the above-mentioned problems occurring in the prior art, and it is an object of the present invention is to provide a handover method for ensuring the mobility of a subscriber station contained in a broadband wireless communication system and performing smooth data communication.

In order to accomplish the aforementioned object, according to one aspect of the present invention, a method is provided for performing a handover by a mobile station in a communication system. A handover request message is transmitted to a serving base station. A first handover response message is received from the serving base station. The first handover response message includes a list of at least one neighbor base station. A value of a handover indication type field is determined from among at least two values individually indicating at least one of a handover cancel and a handover rejection. A handover indication message including the value of the handover indication type field is transmitted to the serving base station. The value representing the handover cancel indicates that the mobile station intends to cancel a handover procedure, and the value representing the handover rejection indicates that the mobile station intends to reject performing handover with any of the at least one neighbor base stations in the list.

In order to accomplish the aforementioned object, according to one aspect of the present invention, a method is provided for performing a handover by a serving base station in a communication system. A handover request message is received from a mobile station. A first handover response message is transmitted to the mobile station. The first handover response message includes a list of at least one neighbor base station. A handover indication message including a value of a handover indication type field is received. The value is determined by the mobile station from among at least two values individually indicating at least one of a handover cancel and the handover rejection. The value representing the handover cancel indicates that the mobile station intends to cancel a handover procedure, and the value representing the handover rejection indicates that the mobile station intends to reject performing handover with any of the at least one neighbor base stations in the list.

In order to accomplish the aforementioned object, according to one aspect of the present invention, a mobile station is provided for performing a handover in a communication system. The mobile station includes a transmitter for transmitting a handover request message to a serving base station, and transmitting a handover indication message including a value of a handover indication type field to the serving base station. The mobile station also includes a receiver for receiving a first handover response message from the serving base station. The first handover response message includes a list of at least one neighbor base station. The mobile station further includes a processor for determining the value of the handover indication type field from among at least two values individually indicating at least one of a handover cancel and a handover rejection. The value representing the handover cancel indicates that the mobile station intends to cancel a handover procedure, and the value representing the handover rejection indicates that the mobile station intends to reject performing handover with any of the at least one neighbor base stations in the list.

In order to accomplish the aforementioned object, according to one aspect of the present invention, a serving base station is provided for performing a handover in a communication system. The serving base station includes a receiver for receiving a handover request message from a mobile station, and receiving a handover indication message including a value of a handover indication type field. The serving base station also includes a transmitter for transmitting a first handover response message to the mobile station. The first handover response message includes a list of at least one neighbor base station. The value is determined by the mobile station from among at least two values individually indicating at least one of a handover cancel and the handover rejection. The value representing the handover cancel indicates that the mobile station intends to cancel a handover procedure, and the value representing the handover rejection indicates that the mobile station intends to reject performing handover with any of the at least one neighbor base stations in the list.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the present invention, a detailed description of known functions and configurations incorporated herein will be omitted when it may make the subject matter of the present invention rather unclear.

In describing the present invention, the terms 'handover' and 'handoff' have the same concept; 'handover' is used together with 'handoff'. That is, when a predetermined mobile station releases a connection with a base station (hereinafter, referred to as a serving base station) currently maintaining a connection with the mobile station according to circumstances, and connects to one (hereinafter, referred to as an object base station or a target base station) of neighbor base stations, the term 'handover' or the term 'handoff' is used.

Also, generally, a base station to/with which the mobile station currently connects and can exchange data is called a serving base station, and a plurality of base stations which are adjacent to the serving base station and can perform a handover procedure according to the moving of the mobile station are called neighbor base stations (neighbor BS).

Figure 1:
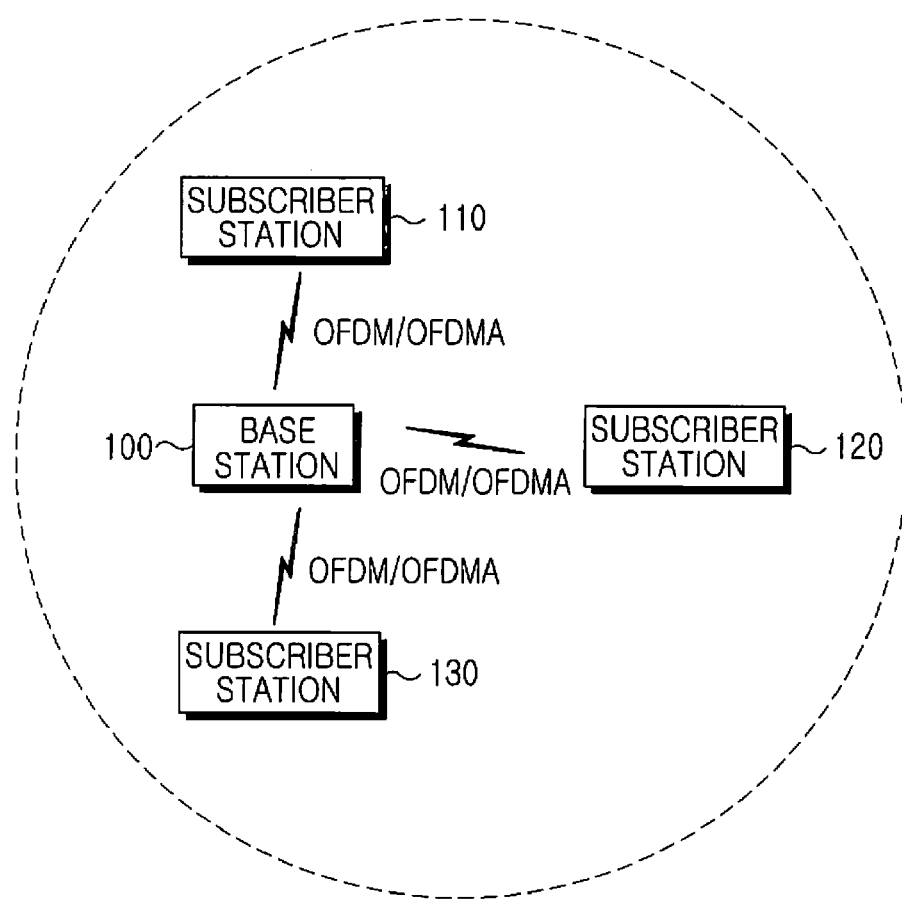
FIG. 1 a block diagram which illustrates a structure of a conventional broadband mobile communication system employing an OFDM/OFDMA method.
Figure 2:
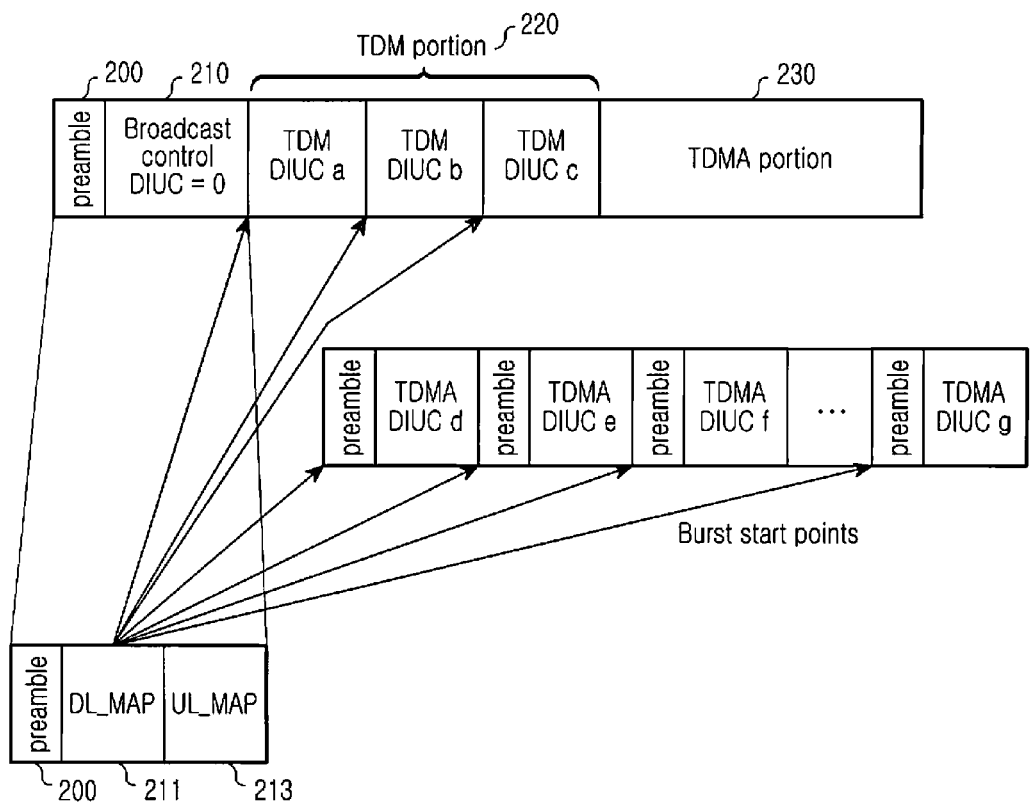
FIG. 2 is a view which illustrates a structure of a downlink frame of a conventional broadband mobile communication system employing an OFDM/OFDMA method.
Figure 3:
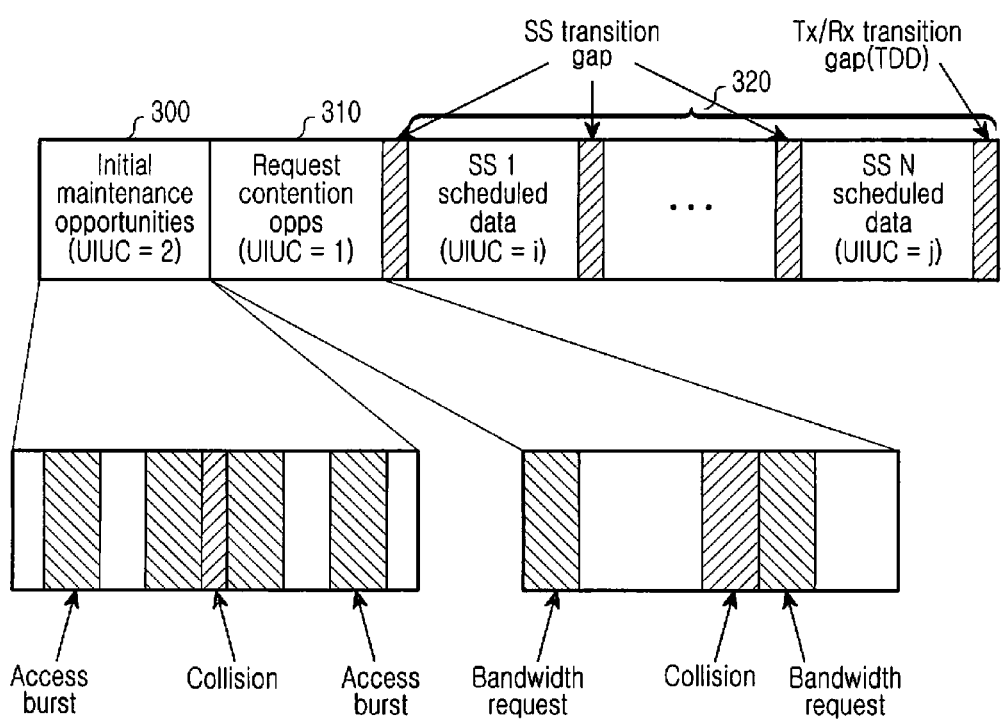
FIG. 3 is a view which illustrates a structure of an uplink frame of a broadband mobile communication system employing an OFDM/OFDMA method.
Figure 4:
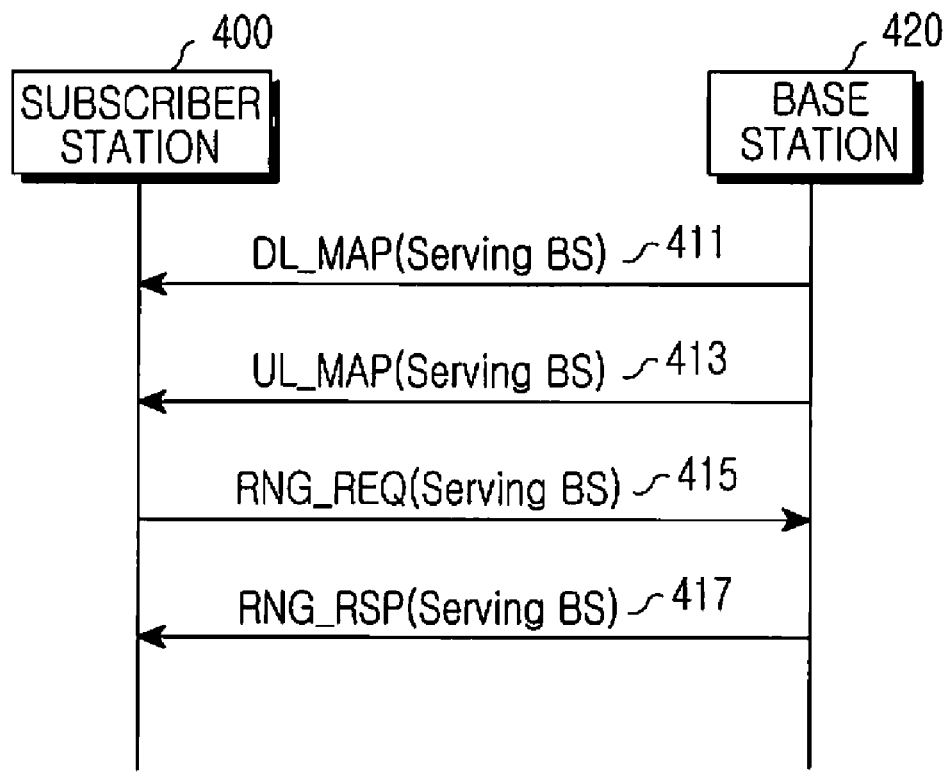
FIG. 4 is a flow diagram illustrating a ranging procedure between a base station and a subscriber station in a broadband mobile communication system employing an OFDM/OFDMA method.
Figure 5:
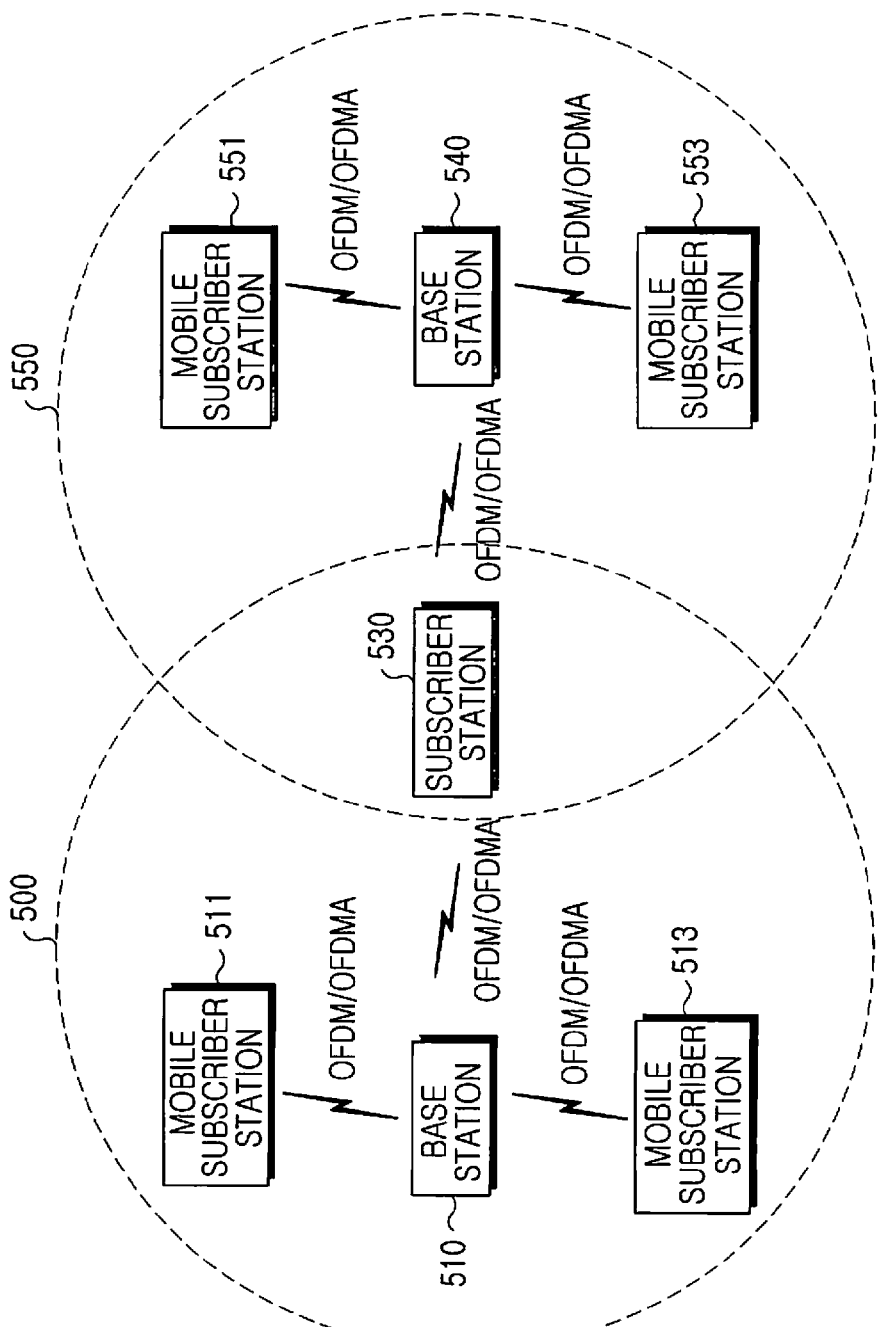
FIG. 5 is a block diagram schematically showing a structure of a broadband mobile communication system employing an OFDM/OFDMA method in a multi-cell.
Figure 6:
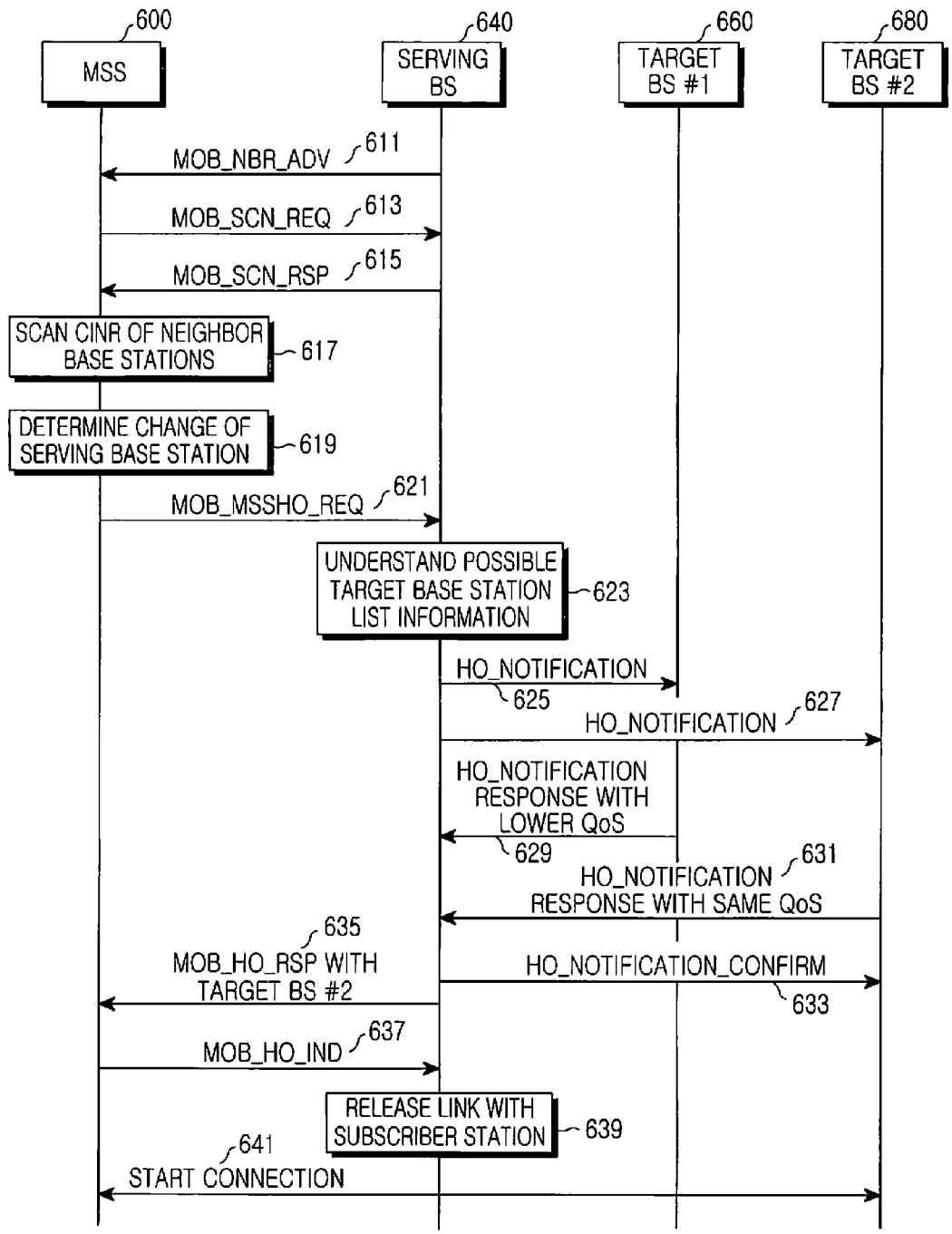
FIG. 6 is a flow diagram illustrating a handover process by request of a subscriber station in a broadband mobile communication system employing an OFDM/OFDMA method.
Figure 7:
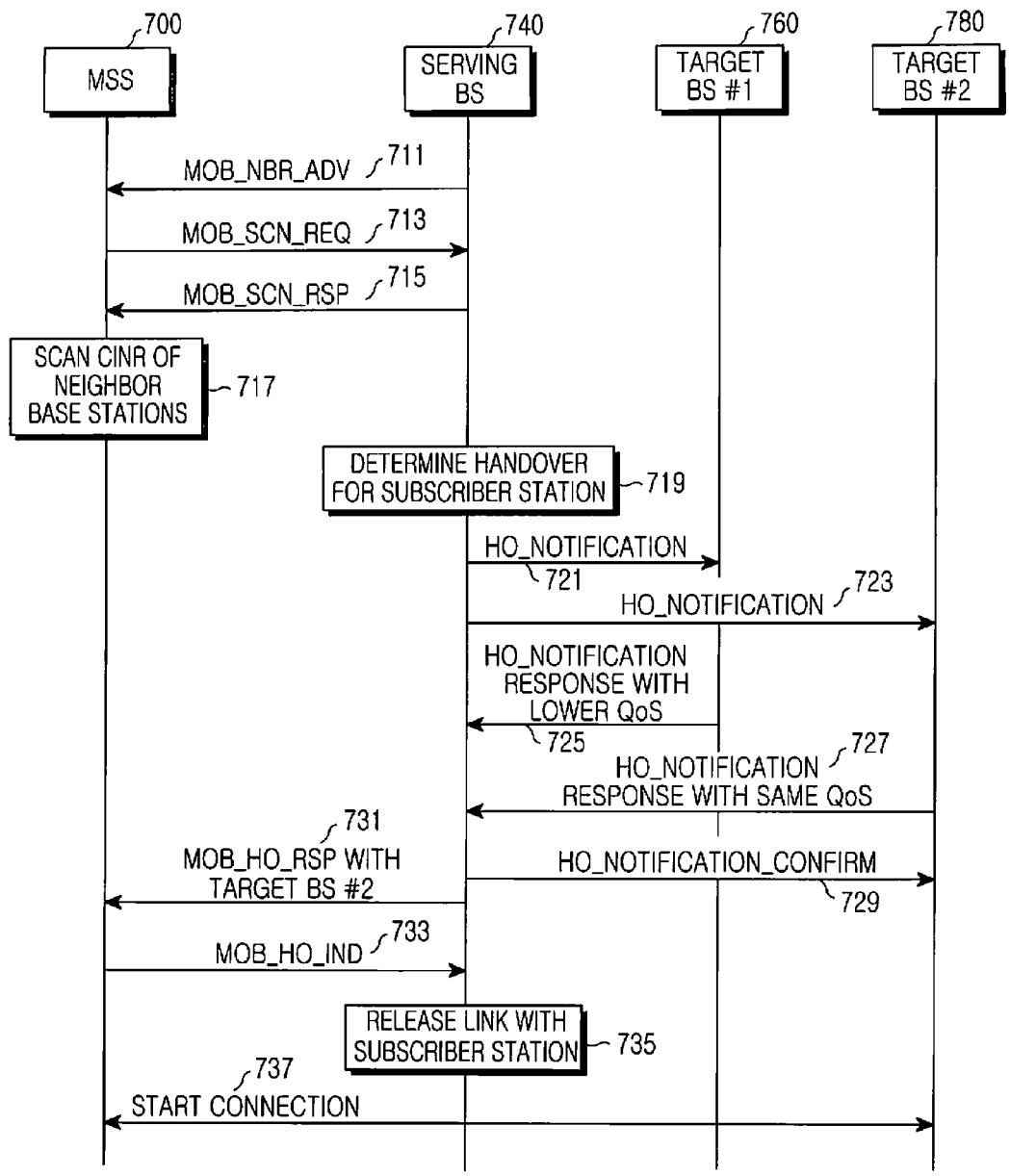
FIG. 7 is a flow diagram illustrating a handover process by request of a base station in a broadband mobile communication system employing an OFDM/OFDMA method.

Meanwhile, in the conventional handover procedure as shown in FIGS. 6 and 7 and described in the corresponding text, peripheral base stations of the serving base station, which are transmitted from the serving base station to the station through a MOB_NBR_ADV message, are called neighbor base stations as described above. Herein, when the mobile station scans CINR values of the neighbor base stations and selects base stations satisfying predetermined conditions from among the neighbor base stations as base stations to which the mobile station can be handed over, the base stations selected by the mobile station are called recommended base stations.

Further, the serving base station transmits HO_notification message to each recommended base station selected by the mobile station or each neighbor base station, and then receives HO_notification response messages. Also, the serving base station selects one or multiple base stations satisfying predetermined conditions under which a handover is possible for the station according to values contained in the received message. Herein, from among the recommended base stations or the neighbor base stations, one or multiple base stations satisfying predetermined conditions selected by serving base station are called target base stations. That is, one or multiple base stations may become the target base station.

Meanwhile, when the serving base station transmits a predetermined message (e.g., MOB_HO_RSP message) containing information on one or more target base stations to the corresponding station, and the station selects one target base station from among one or more target base stations, the finally selected target base station is called a designated target base station.

The present invention proposes various functions enabling a broadband mobile communication system to be capable of effectively processing various situations, in addition to a basic and simple handover function proposed in the conventional broadband mobile communication system. Accordingly, definitions of specific handoffs added according to circumstances proposed by the present invention are as follows.

1) Forced Handoff

A serving base station can command a subscriber station to be handed over to a target base station of a neighbor cell. That is, the subscriber station having received a message containing the forced handoff option must necessarily perform a handoff procedure to a target base station within a time period designated by the serving base station. In the case of the forced handoff, the subscriber station cannot reject the handoff command.

2) Suggesting Handoff

A serving base station transmits a mobile station (also known as a subscriber station) handoff message containing a message, which suggests that a subscriber station perform a handoff procedure to one of object base stations of a neighbor cell according to the request of the subscriber station or the judgment of the serving base station, to the subscriber station. Herein, the serving base station collects information on the base stations in the neighbor cell, selects a list of base stations, which satisfy service requirement conditions enabling the subscriber station to perform a handoff procedure and for which the subscriber station can perform a handoff procedure, and transmits the list to the subscriber station through a predetermined handoff message. When the subscriber station receives the suggesting handoff message, the subscriber station confirms the list of the target base stations contained in the message to select an optimum base station, thereby trying the suggesting handoff.

The handoff type option differently defined as described above is added to a predetermined field of the aforementioned MOB_HO_RSP message and then is transmitted. In the present invention, the handoff type option is added to the MOB_HO_RSP message form described in the prior art, and Table 16 (shown below) shows the new structure of the MOB_ HO_RSP message according to the present invention.

TABLE 16

| Syntax | Size | Notes |
| --- | --- | --- |
| MOB_HO_RSP_message_Format( ) { | | |
|   Management Message Type=53 | 8 bits | |
|   HO Type | 1 bits | 0: suggesting handoff |
| | | 1: forced handoff |
|   Estimated HO time | 8 bits | |
|   N_Recommended | 8 bits | |
|   For (j=0;j< N_NEIGHBORS;J++){ | | |
|     Neighbor BS-ID | 8 bits | |
|     Service level prediction | 8 bits | |
|   } | | |
| } | | |

As shown in Table 16, the MOB_HO_RSP message according to the present invention contains the 'HO Type' field for the application of the present invention. Accordingly, whether the MOB_HO_RSP message is a suggesting handoff or a forced handoff is determined according to the values of the field.

That is, as shown in Table 16, when the 'HO Type' field has a value of 0, a suggesting handoff is performed. In contrast, when the 'HO Type' field has a value of 1, a forced handoff is performed. In processing the 'N_Recommended' field after the function of the handoff is expanded as described above, when the value of the 'HO Type' field represents a suggesting handoff, the 'N_Recommended' field can have a value of more than 1. In contrast, when the value of the 'HO Type' field represents a forced handoff, a serving base station designates a specific target base station and orders a forced handoff. Accordingly, it is preferred that the 'N_Recommended' field has a value of only 1. That is, in the case of the forced handoff, a subscriber station must be handed over to an object base station, which is designated by the value of the 'N_Recommended' field, without alternative.

Accordingly, when the forced handoff and the suggesting handoff are performed as described above, it is preferred that the 'Neighbor BS-ID' field includes a list of one or more base stations in the case of a suggesting handoff and includes a list of only one base station in the case of a forced handoff.

Further, the present invention proposes a method for differently classifying a MOB_HO_IND message transmitted from a station to a base station according to circumstances and transmitting the MOB_HO_ND message in a basic handoff procedure proposed by the conventional broadband wireless mobile communication system. Definitions of procedures relating to each handoff newly added according to this method are as follows.

1) Connection Release

When a handoff has been normally performed and a connection with a serving base station must be ended, a subscriber station transmits a connection end message (i.e., a MOB_HO_ND message) containing a connection end option to the serving base station. The serving base station having received the connection end message immediately releases a connection with the corresponding subscriber station.

2) Handoff Cancel

When a subscriber station moves into an original serving base station again during a handoff and thus it is unnecessary to perform a handoff procedure, or a subscriber station intends to cancel a handoff by other reasons, the subscriber station transmits a MOB_HO_ND message containing a handoff cancel option to the serving base station. The serving base station having received the handoff cancel message immediately cancels a handoff procedure for a corresponding subscriber station. If necessary, the serving base station notifies a proposed object base station that a handoff performance by a corresponding subscriber station has been cancelled.

3) Handoff Rejection

After receiving a HO_RSP message from a serving base station, a subscriber station has not yet determined a proper target base station or does not perform a handoff procedure to a predetermined target base station contained in a target base station list by other reasons, the subscriber station transmits a MOB_HO_IND message containing a handoff rejection option to the serving base station according to the received HO_RSP message.

In the present invention, a 'HO Indication Type' field is added to the MOB_HO_IND message to enable the MOB_HO_IND message according to each state to be processed. Table 17 shows the structure of the MOB_HO_IND message according to the present invention and is illustrated below.

TABLE 17

| Syntax | Size | Notes |
| --- | --- | --- |
| MOB_HO_IND_message_Format( ) { | | |
|   Management Message Type=54 | 8 bits | |
|   HO Indicator Type | 2 bits | 00: Serving BS release |
| | | 01: Handoff cancel |
| | | 10: Handoff rejection |
| | | 11: Reserved |
|   TLV Encoded Information | variable | |
|   Target_BS_ID | 48 bits | |
| } | | |

As shown in Table 17, in order to perform a function proposed by the present invention, the 'HO Indicator Type' field is added to the MOB_HO_IND message, thereby constructing a MOB_HO_IND message having various functions. The 'HO Indicator Type' field in Table 17 is proposed to enable the MOB_HO_IND message to inform a serving base station of a connection release with a base station or handoff rejection according to corresponding values.

For instance, when the 'HO Indicator Type' field has a value of 00, a subscriber station releases a connection with a serving base station similarly to the prior art, and performs a normal handoff procedure to an already received corresponding target base station.

Meanwhile, when the 'HO Indicator Type' field has a binary value of 01, the MOB_HO_IND message represents a handoff cancel. Accordingly, the subscriber station cancels a handoff procedure being performed and maintains a connection with an existing serving base station. Further, when the 'HO Indicator Type' field has a binary value of 10, the MOB_HO_ND message represents a handoff rejection. Accordingly, the subscriber station rejects a handoff to a target base station contained in the MOB_HO_IND message received from a serving base station, and maintains a connection with an existing serving base station. Furthermore, when the 'HO Indicator Type' field has a binary value of 11, the 'HO Indicator Type' field is reserved as a reserved portion.

Further, the HO_notification confirm message defined in Table 13 is a message enabling a serving base station to inform a target base station of a handoff. Accordingly, in the present invention, in the case of a handoff cancel, the HO_notification confirm message is sent in advance, thereby enabling a target base station having received a handoff preparation instruction to understand the cancel of the handoff. That is, the HO_notification confirm message has a changed structure as shown in the following Table 18.

TABLE 18

| Syntax | Size | Notes |
| --- | --- | --- |
| Global Header | 152 bit | |
| Confirm type | 1 bit | 0: handoff preparation<br>1: handoff cancel |
| For (j=0;j< Num Recorders;J++){ | | |
|    MSS unique identifier | 48 bit | |
|    QoS Estimated | 8 bit | |
|    BW Estimated | 8 bit | |
| Security field | TBD | |
| CRC field | 32 bit | |

As shown in Table 18, in order to perform a function proposed by the present invention, the 'Confirm type' field is added to the HO_notification confirm message, thereby constructing a HO_notification confirm message having various functions. According to the 'Confirm type' field having corresponding values in Table 18, the HO_notification_confirm message enables the serving base station to inform the target base station of the performance of a handoff or the cancel of a handoff.

For instance, when the 'Confirm type' field has a value of 0, the HO_notification_confirm message informs the target base station of the handoff of the subscriber station and enables the target base station to prepare the handoff of the subscriber station.

In contrast, when the 'Confirm type' field has a value of 1, the HO_notification_confirm message represents the cancel of the handoff. Accordingly, the target base station cancels the handoff procedure being performed by the already-sent HO_notification_confirm message.

In the present invention as described above, in order to accomplish a handover according to various handover circumstances, related fields of various messages are defined. Hereinafter, a procedure by which a subscriber station rejects or cancels a handover being performed according to each circumstance according to the present invention will be described in detail with reference to FIGS. 8 to 12.

First, a message transmission/reception procedure between a subscriber station and base stations according to an embodiment of the present invention will be described in detail with reference to FIGS. 8 to 10.

Figure 8:
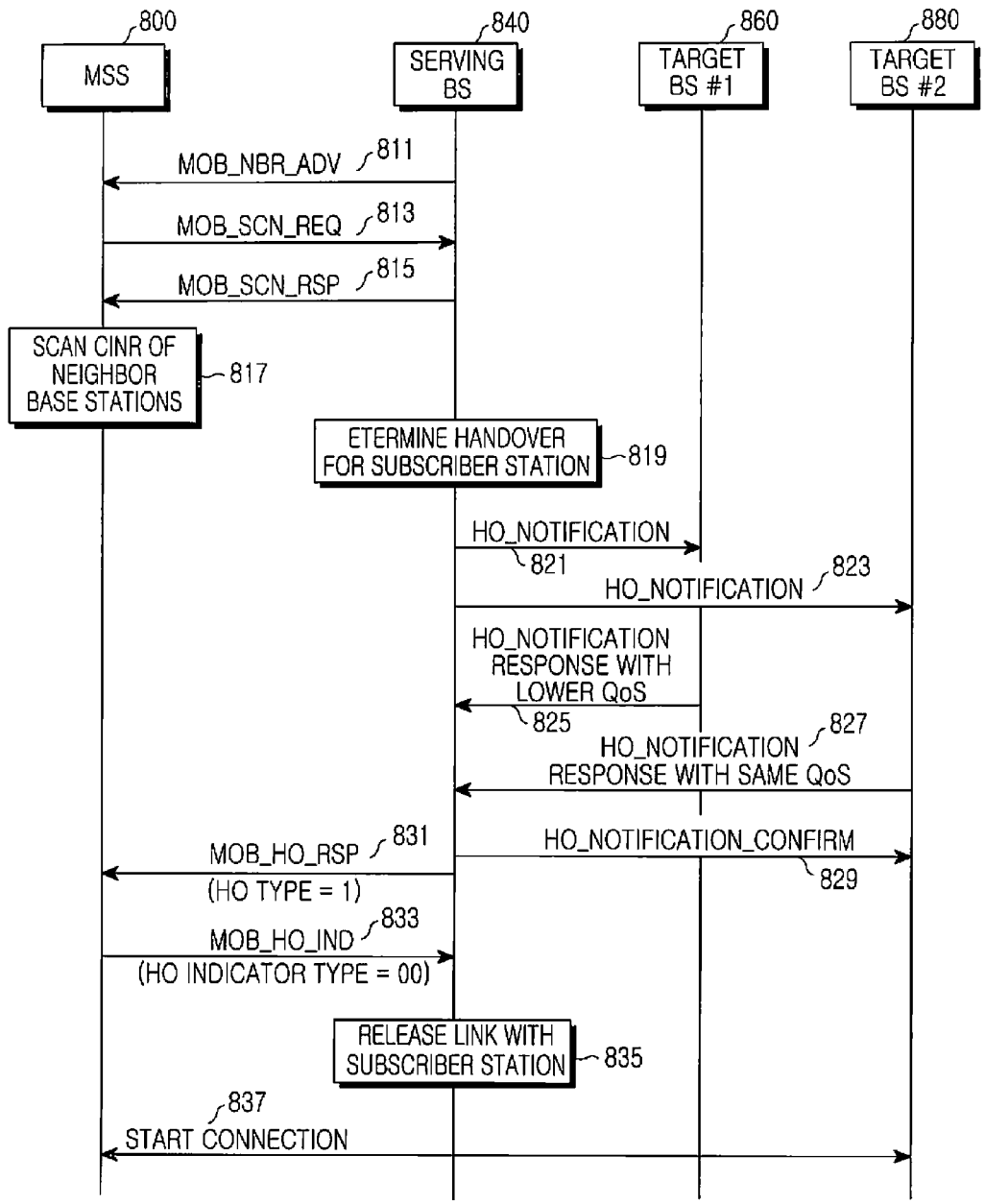
FIG. 8 is a flow diagram illustrating a procedure by which a base station forces a handover in a broadband wireless access communication system according to an embodiment of the present invention.

FIG. 8 is a flow diagram illustrating a case in which a base station determines whether or not a subscriber station performs a handoff procedure and forces the corresponding subscriber station to perform the handoff procedure according to an embodiment of the present invention. FIG. 9 is a flow diagram illustrating a case in which a subscriber station requests a handoff to a serving base station, and then cancels the requested handoff before receiving a response message from the serving base station or after receiving the response message from the serving base station, according to an embodiment of the present invention. Further, FIG. 10 is a flow diagram illustrating a case in which a subscriber station requests a handoff to a serving base station, receives a response message, and rejects the handoff using information of the received response message because a target base station list contained in the response message received in the subscriber station is not proper, according to an embodiment of the present invention.

Meanwhile, messages used in each procedure for achieving the embodiments are messages used in performing the conventional handover. However, the present invention is achieved by adding parameters described in Tables 16 and 17 proposed by the present invention to each of the messages.

Hereinafter, a case in which a base station commands a forced handover will be described with reference to FIG. 8. FIG. 8 is a flow diagram illustrating a procedure by which a base station forces a handover in a broadband wireless access communication system according to an embodiment of the present invention.

Referring to FIG. 8, a base station determines a handover for a mobile subscriber station as described in FIG. 7. Accordingly, since a procedure for steps 811, 813, 815, 817, 819, 821, 823, 825, 827, and 829 in FIGS. 8, and 829 is the same as that for steps 711, 713, 715, 717, 719, 721, 723, 725, 727, and 729 in FIG. 7, respectively, a description about the procedure will be omitted.

A serving base station 840 determines object base stations among a plurality of target base stations to which a mobile subscriber station can be handed over, transmits a HO_notification_confirm message to the object base station through step 829, and then transmits a list of the determined target base stations, to which a mobile subscriber station can be handed over, to the corresponding mobile subscriber station through a MOB_HO_RSP message.

Meanwhile, after the procedure, the present invention enables the following process to be performed. That is, in a case in which the MOB_HO_RSP message is transmitted, when the MOB_HO_RSP message containing information signifying that the MOB_HO_RSP message is a message of a forced handover is transmitted in step 831, for instance, the MOB_HO_RSP message containing information (HO Type=1) reporting a forced handover is transmitted, the mobile subscriber station 800 having received the MOB_HO_RSP message does not reject the forced handover instruction. Accordingly, the mobile subscriber station 800 receives the MOB_HO_RSP message containing information (HO Type=1) of the forced handover, and must perform a handover procedure to a base station, to which the mobile subscriber station 800 must be handed over, contained in the MOB_HO_RSP message. That is, the mobile subscriber station 800 transmits a MOB_HO_IND message to the serving base station 840 in step 833, releases a link with the serving base station 840 in step 835, and starts a connection with the corresponding base station to which the mobile subscriber station 800 must be handed over in step 837.

Meanwhile, in order to signify that the MOB_HO_RSP message is a forced handover message, the 'HO Type' field is added to the MOB_HO_RSP message as shown in Table 16, and then the MOB_HO_RSP message including the 'HO Type' field is transmitted.

For instance, as described above, when the 'HO Type' field is set to have a value of 1, the mobile subscriber station having received the MOB_HO_RSP message recognizes that the MOB_HO_RSP message is a forced handover message, and then does not reject the determined handover. That is, the mobile subscriber station receives the MOB_HO_RSP message and then must perform a handover procedure to one selected base station among the base stations, to which the mobile subscriber station 800 must be handed over, contained in the MOB_HO_RSP message. When the number of the base stations, to which the mobile subscriber station 800 must be handed over, contained in the MOB_HO_RSP message is one, the mobile subscriber station must unconditionally perform a handover procedure to the base station to which the mobile subscriber station 800 must be handed over.

Meanwhile, when the mobile subscriber station transmits the MOB_HO_IND message to the serving base station, it is possible to generate and transmit the MOB_HO_RSP message having the form as shown in Table 17. That is, the mobile subscriber station can select the type of the MOB_HO_ND message and transmit the selected type of MOB_HO_IND message. Herein, since the MOB_HO_IND message is a message transmitted when the mobile subscriber station cannot reject or cancel a handover, it is preferred that the value of the 'HO Indicator Type' field described in Table 17 is set to be 00 and then the MOB_HO_IND message is transmitted. Herein, a case in which the value of the 'HO Indicator Type' field is set to be 00 is a case in which the mobile subscriber station releases a link with the serving base station and performs a normal handover procedure.

Hereinafter, a case in which the mobile subscriber station rejects or cancels a handover being performed will be described with reference to FIGS. 9 and 10.

Herein, cancellation of the handover represents a case in which the mobile subscriber station randomly stops the handover procedure before the serving base station selects target base stations and transmits a MOB_HO_RSP message to the mobile subscriber station, that is, the mobile subscriber station receives the handover response message including the list of the target base stations, in performing the handover. Further, the rejection of the handover represents a case in which the mobile subscriber station randomly stops a determined handover procedure after the serving base station selects target base stations and transmits a MOB_HO_RSP message to the mobile subscriber station, that is, the mobile subscriber station receives the handover response message including the list of the target base stations, in performing the handover.

First, a case in which the mobile subscriber station cancels a handover being performed will be described with reference to FIG. 9, and then a case in which the mobile subscriber station rejects a determined handover will be described with reference to FIG. 10.

Figure 9:
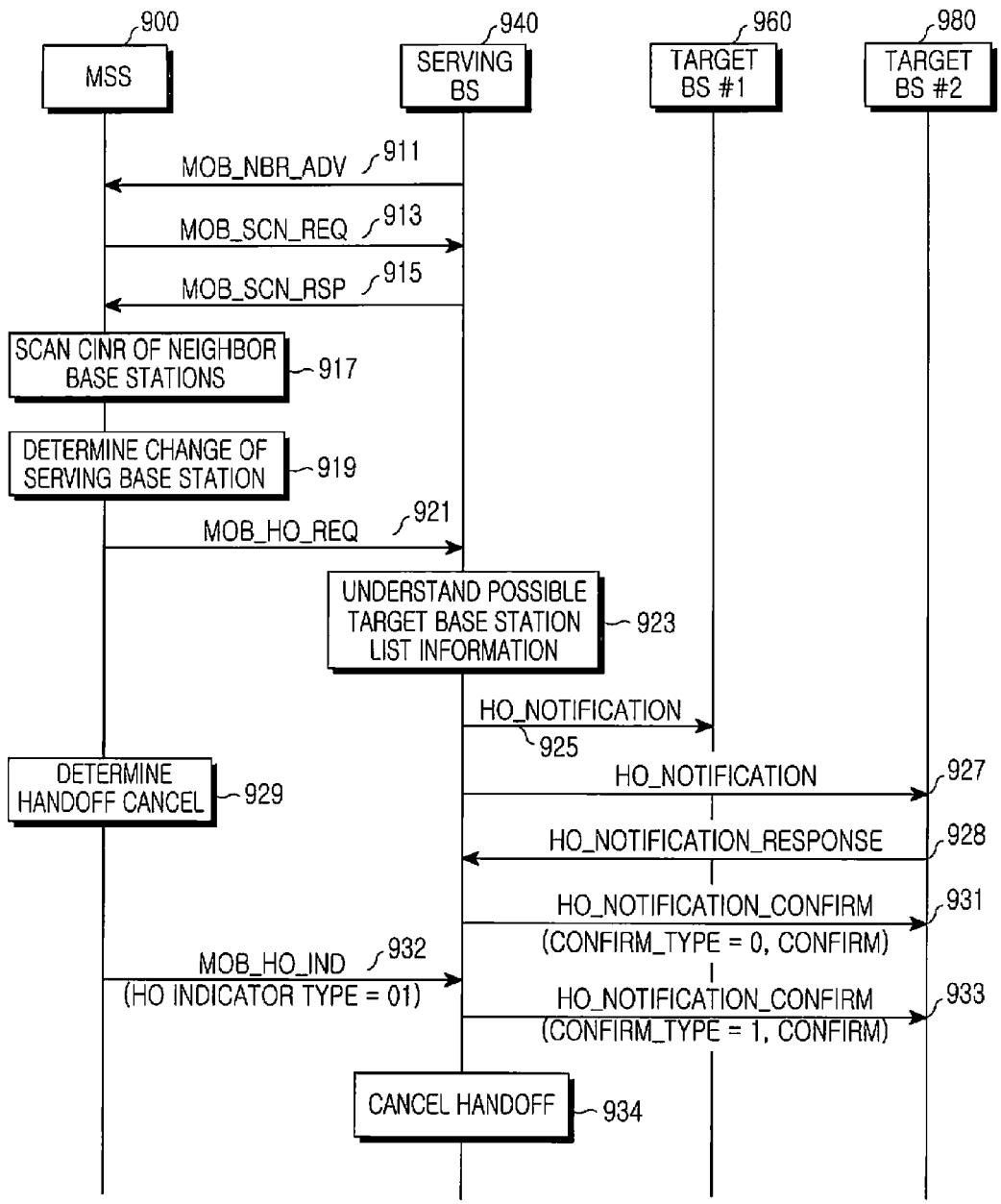
FIG. 9 is a flow diagram illustrating a procedure by which a subscriber station cancels a handover in a broadband wireless access communication system according to an embodiment of the present invention.

FIG. 9 is a flow diagram illustrating a procedure by which a mobile subscriber station cancels a handover in a broadband wireless access communication system according to an embodiment of the present invention.

Referring to FIG. 9, the mobile subscriber station 900 receives information on neighbor base stations from a serving base station 940 in step 911 and determines whether to perform a scanning or not in steps 913 and 915. Then, the mobile subscriber station 900 scans the CINRs of the neighbor base stations in step 917, determines the change of the serving base station 940 in step 919, and transmits a MOB_HO_REQ message to the serving base station 940 in step 921. Herein, the serving base station 940 refers to the received MOB_HO_REQ message in step 923 and transmits HO_notification messages to corresponding recommended base stations in steps 925 and 927. Therefore, a handover procedure is performed.

Next, in step 925, the recommended base stations having received the HO_notification messages transmit HO_notification_response messages containing information regarding whether or not the recommended base stations can perform the handover procedure to the serving base station 940 in step 928. Then, the serving base station 940 having received the HO_notification_response messages determines a base station to which the mobile subscriber station 900 is to be handed over to, of the recommended base stations having sent the response messages, and transmits a HO_notification_confirm message to the determined base station in steps 931 and 933, thereby causing the determined base station to prepare the handover so that the mobile subscriber station 900 can be handed over to the determined base station.

Meanwhile, when the mobile subscriber station 900 intends to cancel the handover while the handover procedure is performed, the mobile subscriber station 900 determines to cancel the handover in step 929. Then, the mobile subscriber station 900 transmits the MOB_HO_ND message containing cancel determination information (i.e., the value of HO indicator type is set to be 01) to the serving base station 940 in step 932, thereby canceling the handover procedure being performed in step 934.

Herein, a method for including the cancel determination information into the MOB_HO_IND message can be achieved by adding the 'HO indicator type' field as described in Table 17. That is, the serving base station 940 receives the MOB_HO_IND message transmitted from the mobile subscriber station 900 in step 932, confirms the information of the 'HO indicator type' field added to the message, and recognizes that the MOB_HO_ND message is a message reporting the cancel of the handover.

For instance, the 'HO indicator type' field may include two bits and has a value of 01 as described above, thereby signifying that the MOB_HO_IND message is a cancel message. Then, the serving base station 940 having received the MOB_HO_ND message containing the handover cancel message information stops the handover procedure being performed and continuously maintains a link with the mobile subscriber station 900 in step 934.

Herein, the procedure is classified according to a case (step 931) in which the MOB_HO_ND message reporting the cancel of the handover is received by the serving base station 940 after the HO_notification confirm message has been transmitted from the serving base station 940 to a target base station, and a case (step 933) in which the MOB_HO_IND message reporting the cancel of the handover is received by the serving base station 940 before the HO_notification_confirm message is transmitted from the serving base station 940 to the target base station.

That is, after transmitting the HO_notification message to the target base station (step 927) and then receiving the HO_notification_response message from the target base station (step 928), the serving base station 940 selects a target base station to which the mobile subscriber station 900 can be actually handed over. Herein, when the serving base station 940 determines the target base station to which the mobile subscriber station 900 can be actually handed over, the serving base station 940 transmits the HO_notification_confirm message to the selected corresponding target base station (step 931), thereby enabling the corresponding target base station to prepare the handover so that the mobile subscriber station 900 can be handed over to the corresponding target base station.

However, when the mobile subscriber station 900 transmits the MOB_HO_IND message in order to report the cancellation of the handover before the HO_notification_confirm message is transmitted from the serving base station 940 to the target base station (step 933), the serving base station 940 performs a different operation. Hereinafter, this operation will be described in detail.

That is, when the MOB_HO_IND message reaches the serving base station 940 (step 932) before the serving base station 940 transmits the HO_notification_confirm message to the target base station (step 933), the serving base station 940 cancels every handover procedure (step 934). Accordingly, the handover is cancelled.

In contrast, a case in which the MOB_HO_IND message is transmitted to the serving base station 940 (step 932) after the transmission of the HO_notification_confirm message (step 931) is a case in which the serving base station 940 has already transmitted the HO_notification_confirm message to the target base station (step 931) and has reported the handover. Accordingly, on receiving the MOB_HO_ND message from the mobile subscriber station 900, the serving base station 940 must transmit the message to the corresponding target base station again to report the cancellation of the handover.

Herein, since the HO_notification_confirm message transmitted from the serving base station 940 to the target base station is used in both a case for reporting the performance of a normal handover and a case for reporting the cancellation of the handover, the two cases are distinguished by the 'Confirm type' field as shown in Table 18. Herein, the 'Confirm type' field has a length of 1 bit. Accordingly, when the 'Confirm type' field has a value of 0, the HO_notification_confirm message reports the performance of a normal handover. In contrast, when the 'Confirm type' field has a value of 1, the HO_notification_confirm message reports the cancel of the handover.

Further, a case in which the handover is cancelled is a case in which a handover procedure has been performed as a result of the mobile subscriber station 900 going away from the serving base station 940 and approaching one of neighbor base stations, but the mobile subscriber station 900 must be handed over to the serving base station 940 again as a result of the mobile subscriber station 900 approaching the original serving base station 940 again during the performance of the handover procedure.

Herein, according to the prior art, after being handed over to a neighbor base station, a mobile subscriber station must be handed over to an original serving base station again. Further, in a special situation, there may occur a case which such a handover must be performed continuously and repeatedly. However, according to the present invention, an unnecessary handover is not repeated and a connection with a serving base station can be continuously maintained.

Hereinafter, a case in which the mobile subscriber station rejects a determined handover will be described with reference to FIG. 10.

Figure 10:
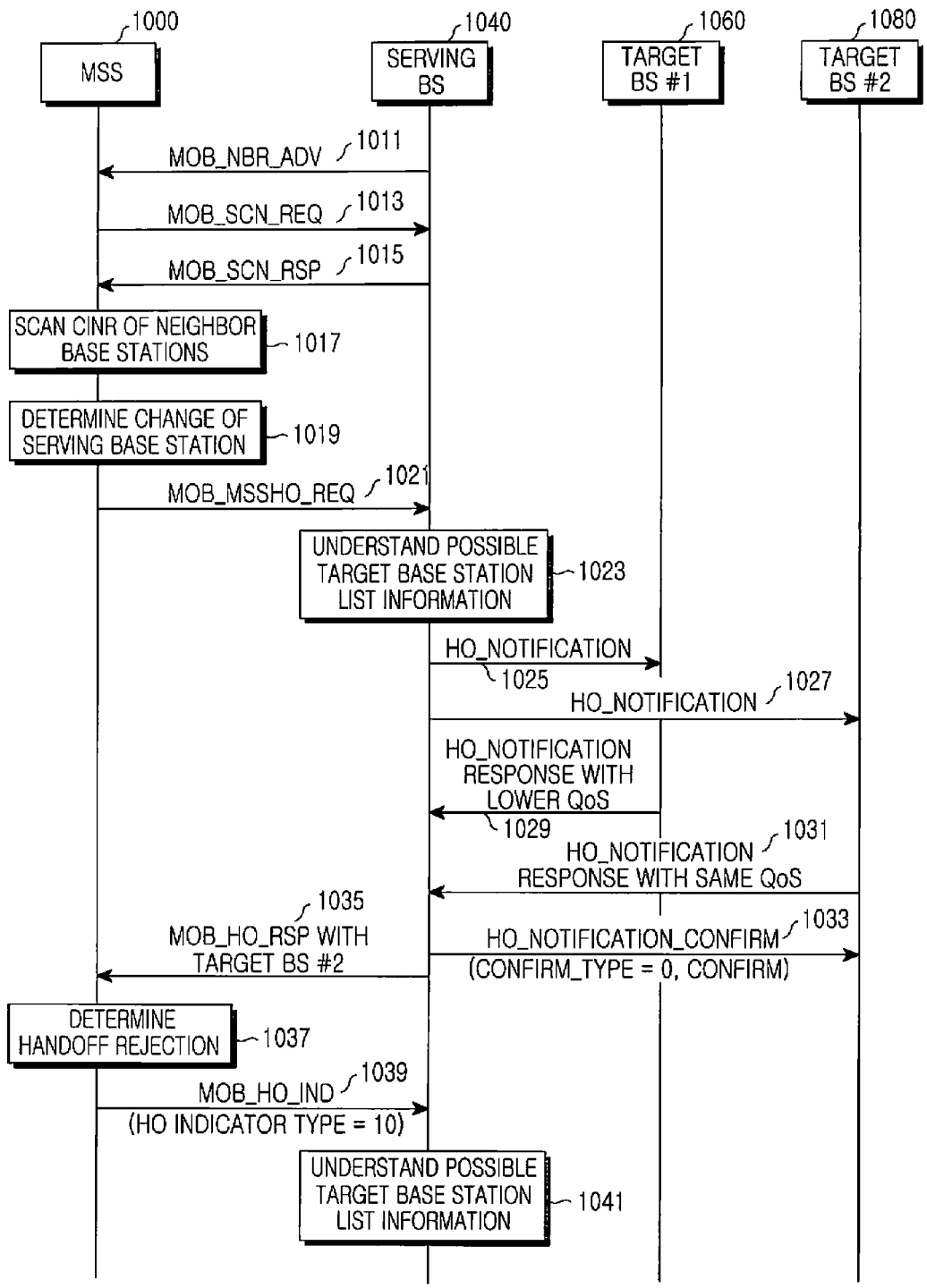
FIG. 10 is a flow diagram illustrating a procedure by which a subscriber station rejects a handover in a broadband wireless access communication system according to an embodiment of the present invention.

FIG. 10 is a flowchart illustrating a procedure by which a mobile subscriber station rejects a handover in a broadband wireless access communication system according to an embodiment of the present invention.

Referring to FIG. 10, the mobile subscriber station 1000 receives information on neighbor base stations from a serving base station 1040 in step 1011 and determines whether to perform a scanning or not in steps 1013 and 1015. Then, the mobile subscriber station 1000 scans the CINRs of the neighbor base stations in step 1017, determines the change of the serving base station 1040 in step 1019, and transmits a MOB_HO_REQ message to the serving base station 1040 in step 1021. Then, the serving base station 1040 refers to the received MOB_HO_REQ message in step 1023 and transmits HO_notification messages to corresponding recommended base stations in steps 1025 and 1027. Meanwhile, the serving base station 1040 receives HO_notification_response messages from the corresponding recommended base stations, selects target base stations according to the message reception result, and transmits a MOB_HO_RSP message to the mobile subscriber station 1000 in step 1035. Therefore, a handover is determined.

That is, a procedure for steps 1011, 1013, 1015, 1017, 1019, 1021, 1023, 1025, 1027, 1029, 1031, 1033, and 1035 in FIG. 10 is identical to that for steps 611, 613, 615, 617, 619, 621, 623, 625, 627, 629, 631, 633, and 635 in FIG. 6, respectively.

Meanwhile, after the target base stations to which the mobile subscriber station 1000 can be handed over are determined and the mobile subscriber station 1000 receives the MOB_HO_RSP message from the serving base station 1040, when the mobile subscriber station 1000 intends to reject the determined handover, the mobile subscriber station 1000 determines a handover rejection in step 1037 and transmits MOB_HO_IND message containing rejection determination information to the serving base station 1040, thereby rejecting the determined handover.

Herein, a method for including the rejection determination information into the MOB_HO_ND message can be achieved by adding the 'HO indicator type' field as described in Table 17. That is, the serving base station 1040 having received the MOB_HO_ND message confirms the information of the 'HO indicator type' field added to the message, and recognizes that the MOB_HO_ND message is a message reporting the rejection of the handover.

For instance, the 'HO indicator type' field may include two bits and has a value of 01 as described above, thereby signifying that the MOB_HO_IND message is a rejection message. Then, the serving base station 1040 having received the MOB_HO_ND message containing the handover rejection message information stops the determined handover procedure and continuously maintains a link with the mobile subscriber station 1000 in step 1041. Herein, since the serving base station 1040 has already selected the target base stations and has transmitted HO_notification confirmation messages to the target base stations, the target base stations judges that the mobile subscriber station 1000 performs the handover procedure. Accordingly, it is preferred that the serving base station 1040 notifies the target base stations of the stop of the handover.

Meanwhile, a case in which the handover is rejected is a case in which the mobile subscriber station 1000 has received a HO_RSP message from the serving base station 1040, but does not select a proper target base station because there is no base station satisfying a predetermined condition from among the target base stations contained in the message. That is, since the mobile subscriber station 1000 cannot be handed over to any base station of the target base stations contained in the message transmitted from the serving base station 1040, it is preferred that the mobile subscriber station 1000 rejects the handover.

In the above description, a transmission procedure of messages exchanged between a mobile subscriber station and base stations in performing a procedure of a forced handover, a cancel procedure of a handover, and a rejection procedure of a handover performed in various circumstances according to the present invention has been described.

Hereinafter, a procedure performed by the mobile subscriber station according to embodiments of the present invention will be described with reference to FIGS. 11 and 14.

1. Handover Forced by a Base Station

Figure 11:
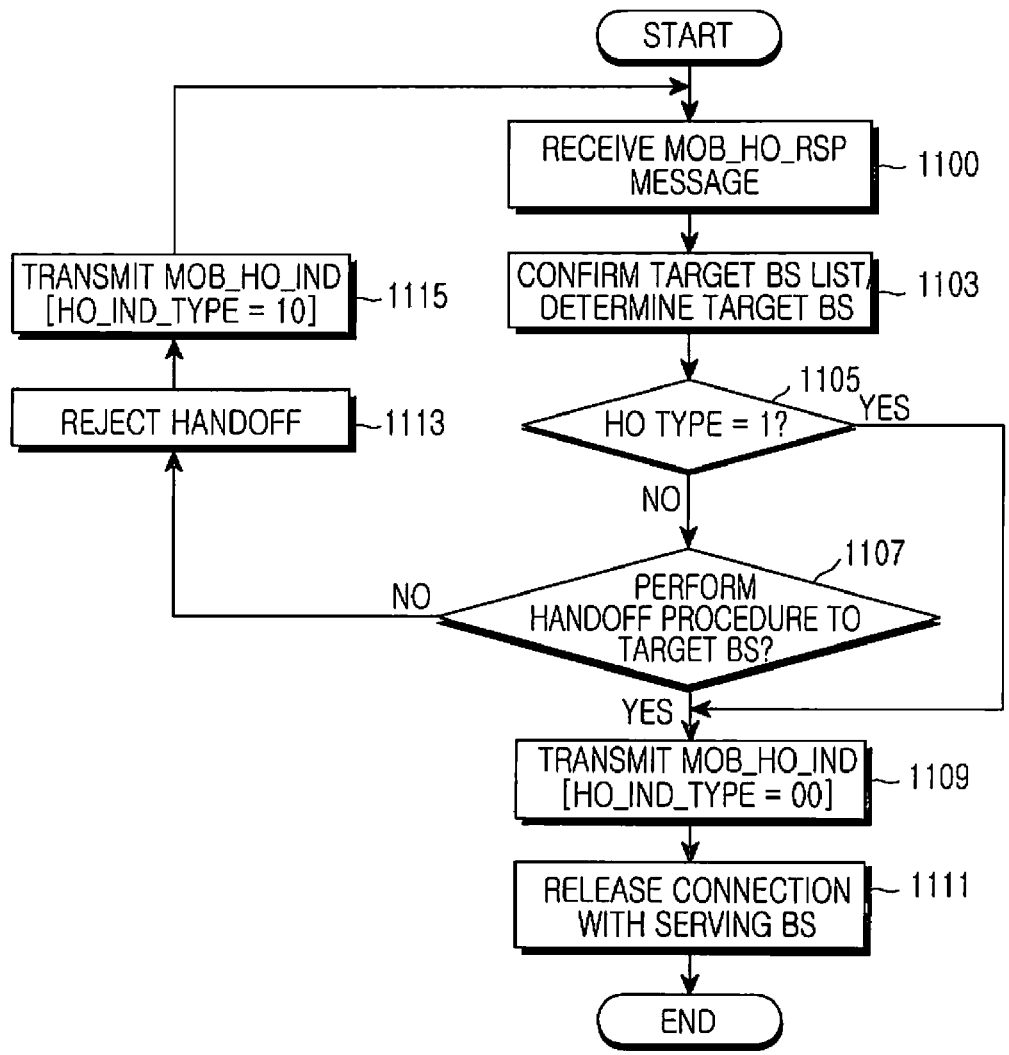
FIG. 11 is a flowchart illustrating a procedure by which a base station forces a handover in a broadband wireless access communication system according to a first embodiment of the present invention.

FIG. 11 is a flowchart illustrating a procedure by which a base station forces a handover in a broadband wireless access communication system according to a first embodiment of the present invention.

Referring to FIG. 11, as described above, a mobile subscriber station receives a MOB_HO_RSP message from a serving base station while a handover procedure is performed in step 1100. Herein, the MOB_HO_RSP message contains the lists of target base stations selected by the serving base station. Accordingly, the mobile subscriber station confirms the lists of the target base stations through the MOB_HO_RSP message and determines one base station to be a designated target base station in step 1103.

Further, as described in FIG. 8 according to the present invention, when the 'HO Type' field of the MOB_HO_RSP message has been set to have a value of 1 in step 1105, the MOB_HO_RSP message becomes a message signifying that the serving base station forces the mobile subscriber station to be inevitably handed over to the target base stations. Accordingly, the mobile subscriber station does not reject the determined handover procedure and transmits a MOB_HO_ND message in step 1109. Further, the mobile subscriber station releases a connection with the serving base station in step 1111.

In contrast, when the 'HO Type' field of the MOB_HO_RSP message has been set to have a value of 0, since the MOB_HO_RSP message is not a message representing a forced handover, the mobile subscriber station can reject the handover according to its own judgment. Accordingly, when the mobile subscriber station rejects the handover instead of being handed over to the target base stations in step 1113, the mobile subscriber station sets the 'HO indicator type' field constituting the MOB_HO_ND message to have a value of 10 and transmits the MOB_HO_IND message in step 1115 as described above. In contrast, when the mobile subscriber station is normally handed over to the target base stations, the mobile subscriber station sets the 'HO indicator type' field to have a value of 00, transmits the MOB_HO_ND message to the serving base station in step 1109, and releases a connection with the serving base station in step 1111.

Hereinafter, a procedure by which a mobile subscriber station cancels or rejects a handover according to predetermined conditions during the handover will be described in detail with reference to FIGS. 12 and 14.

2. The Cancellation and Rejection of a Handover According to a Threshold Value.

Figure 12:
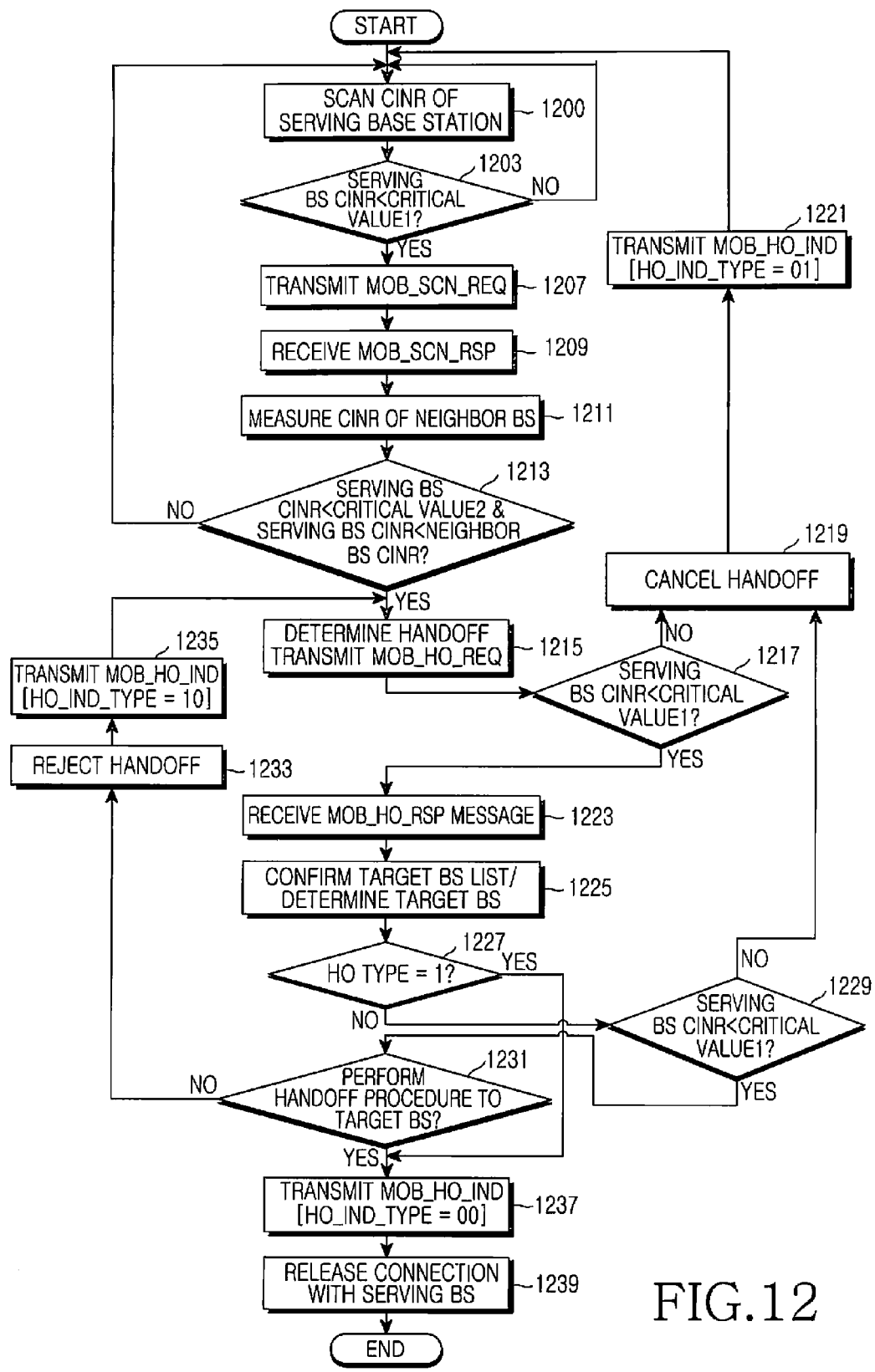
FIG. 12 is a flowchart illustrating a procedure by which a subscriber station cancels or rejects a handover in a broadband wireless access communication system according to a second embodiment of the present invention.

FIG. 12 is a flowchart illustrating a procedure by which a mobile subscriber station cancels or rejects a handover in a broadband wireless access communication system according to a second embodiment of the present invention.

Referring to FIG. 12, the mobile subscriber station compares the CINR of a serving base station with a predetermined threshold value and determined whether to perform a handover procedure or not. Further, while performing the handover procedure, the mobile subscriber station determines to cancel the handover by means of a second threshold value different from the first threshold value.

First, the mobile subscriber station scans the CINR of the serving base station in step 1200. As a result of the scanning, when the CINR of the serving base station is smaller than a first predetermined threshold value, the mobile subscriber station determines that it is difficult to exchange data with the serving base station, and measures the CINRs of neighbor base stations in step 1211. That is, in order to scan the CINRs of the neighbor base stations, the mobile subscriber station transmits a MOB_SCN_REQ message to the serving base station in step 1207 and receives a MOB_SCN_RSP message from the serving base station in step 1209.

The mobile subscriber station having received the MOB_SCN_RSP message measures the CINRs of the neighbor base stations in step 1211. As a result of the measurement, when the CINR of the serving base station is smaller than a second predetermined threshold value and the CINR of one of the neighbor base stations in step 1213, the mobile subscriber station determines a handover and transmits a MOB_HO_REQ message to the serving base station in step 1215. In contrast, when such a condition is not satisfied, returns to step 1200. That is, the mobile subscriber station repeats the aforementioned procedure.

Meanwhile, while the MOB_HO_REQ message is transmitted to the serving base station and the handover procedure is performed according to the present invention, the mobile subscriber station continuously measures the CINR of the serving base station and compares the CINR of the serving base station with the first critical value. As a result of the comparison, when the CINR of the serving base station is still smaller than the first threshold value, the handover procedure is normally performed. In contrast, when the CINR of the serving base station grows larger than the first threshold value due to the movement of the mobile subscriber station in step 1217, the mobile subscriber station cancels the handover procedure being performed in step 1219. Accordingly, when the mobile subscriber station determines to cancel the handover procedure in this way, the mobile subscriber station transmits a MOB_HO_IND message (i.e., the value of the 'HO Indicator Type' field is set to be 01) containing handover cancel information to the serving base station in step 1221. Then, the serving base station having received the MOB_HO_IND message cancels the handover procedure and continuously maintains a connection with the mobile subscriber station.

Meanwhile, when the CINR of the serving base station is still smaller than the first threshold value during the performance of the handover as described above, the serving base station normally performs the handover procedure and transmits a MOB_HO_RSP message to the mobile subscriber station. Next, the mobile subscriber station having received the MOB_HO_RSP message from the serving base station in step 1223 confirms a list of target base stations contained in the MOB_HO_RSP message, determines one target base station to be a designated target base station according to conditions in step 1225.

Herein, when the MOB_HO_RSP message is a forced handover message, that is, when the 'HO Type' field contained in the MOB_HO_RSP message has been set to have a value of 1, a forced handover is performed according to the procedure described in FIG. 11. In other words, the mobile subscriber station transmits the MOB_HO_IND message in step 1237 and release a connection with the serving base station in step 1239. Further, the mobile subscriber station is handed over to one base station contained in the list of the target base stations transmitted from the serving base station.

In contrast, when the MOB_HO_RSP message is not the forced handover message, that is, when the 'HO Type' field contained in the MOB_HO_RSP message has been set to have a value of 0, it is possible to continuously measure the CINR of the serving base station according to the second embodiment of the present invention. That is, when the CINR of the serving base station is larger than the first threshold value in step 1229, the handover can be cancelled in step 1219. Otherwise, the handover can be normally performed. In contrast, when the CINR of the serving base station is still smaller than the first threshold value, whether to perform a normal handover procedure to the target base station or not is determined in step 1231. From the result of the determination, the handover is rejected in step 1233 or the handover is performed in steps 1237 and 1239.

3. Cancel and Rejection of a Handover According to the Comparison of CINRs

Figure 13:
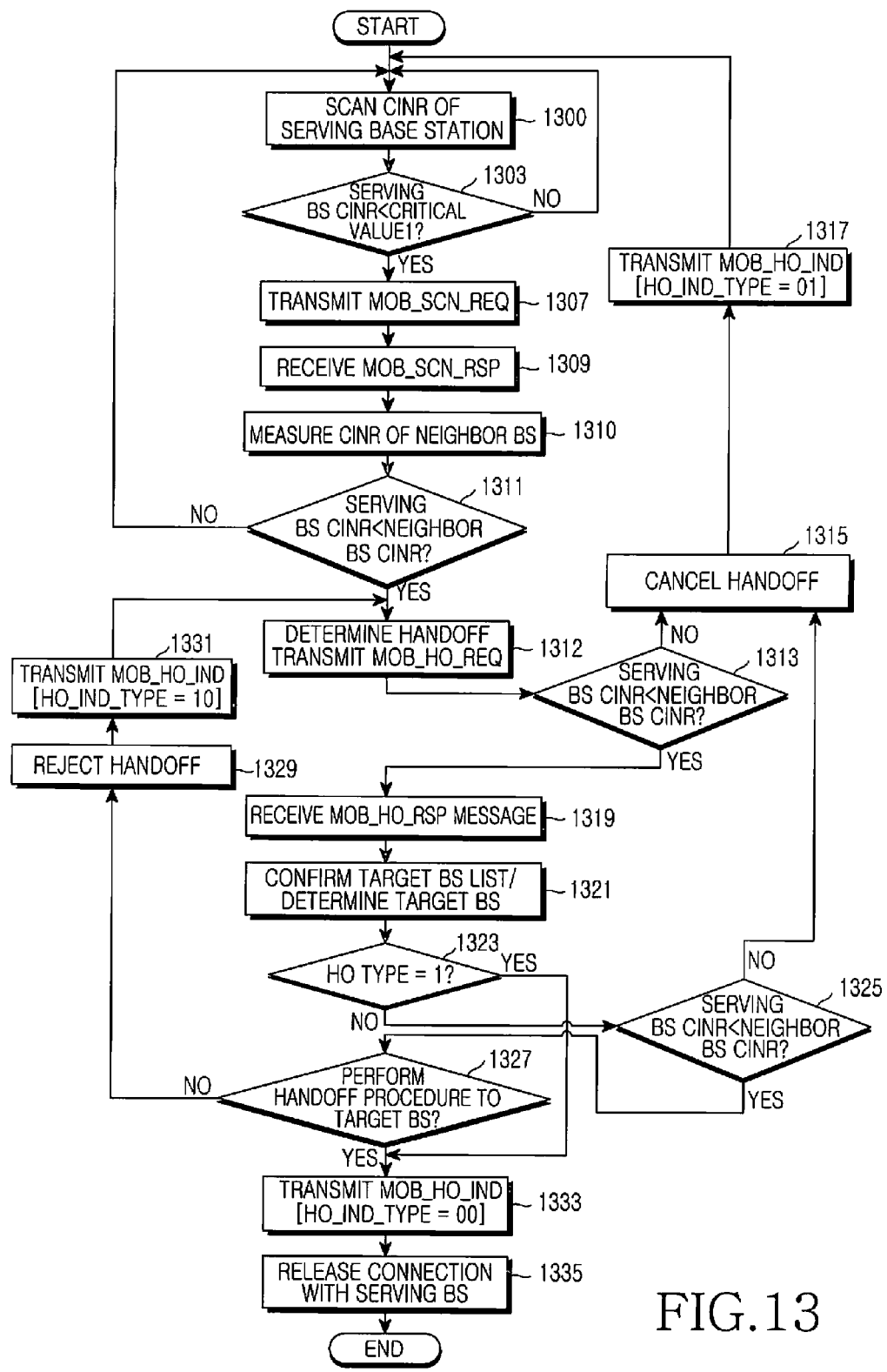
FIG. 13 is a flowchart illustrating a procedure by which a subscriber station cancels or rejects a handover in a broadband wireless access communication system according to a third embodiment of the present invention.

FIG. 13 is a flowchart illustrating a procedure by which a mobile subscriber station cancels or rejects a handover in a broadband wireless access communication system according to a third embodiment of the present invention.

The third embodiment of the present invention shown in FIG. 13 performs the same procedure as that of the second embodiment of FIG. 12, but a difference exists in reference values in performing the determination of the handover and the determination of the handover cancellation.

Referring to FIG. 13, the mobile subscriber station compares the CINR of a serving base station with a predetermined threshold value and determined whether to perform a handover procedure or not. Further, while performing the handover procedure, the mobile subscriber station determines the handover or the cancellation of the handover by means of another threshold value different from the threshold value.

First, the mobile subscriber station scans the CINR of the serving base station in step 1300. As a result of the scanning, when the CINR of the serving base station is smaller than a predetermined threshold value, the mobile subscriber station determines that it is difficult to exchange data with the serving base station, and measures the CINR of neighbor base stations in step 1311. That is, in order to scan the CINR of the neighbor base stations, the mobile subscriber station transmits a MOB_SCN_REQ message to the serving base station in step 1307 and receives a MOB_SCN_RSP message from the serving base station in step 1309.

The mobile subscriber station having received the MOB_SCN_RSP message measures the CINR of the neighbor base stations in step 1310. As a result of the measurement, when the CINR of the serving base station is smaller than the CINR of one of the neighbor base stations in step 1311, the mobile subscriber station determines a handover and transmits a MOB_HO_REQ message to the serving base station in step 1312. In contrast, when such a condition is not satisfied, returns to step 1300. That is, the mobile subscriber station repeats the aforementioned procedure.

Meanwhile, while the MOB_HO_REQ message is transmitted to the serving base station and the handover procedure is performed according to the present invention, the mobile subscriber station continuously measures the CINR of the serving base station and compares the CINR of the serving base station with the CINR of the neighbor base stations. As a result of the comparison, when the CINR of the serving base station is still smaller than the CINR of the neighbor base stations, the handover procedure is normally performed. In contrast, when the CINR of the serving base station grows larger than the CINR of the neighbor base stations due to the movement of the mobile subscriber station in step 1313, the mobile subscriber station cancels the handover procedure being performed in step 1315. Accordingly, when the mobile subscriber station determines to cancel the handover procedure in this way, the mobile subscriber station transmits a MOB_HO_ND message (i.e., the value of the 'HO Indicator Type' field is set to be 01) containing handover cancel information to the serving base station in step 1317. Then, the serving base station having received the MOB_HO_IND message cancels the handover procedure and continuously maintains a connection with the mobile subscriber station.

Meanwhile, when the CINR of the serving base station is still smaller than the CINR of the neighbor base stations during the performance of the handover, the serving base station normally performs the handover procedure and transmits a MOB_HO_RSP message to the mobile subscriber station. Next, the mobile subscriber station having received the MOB_HO_RSP message from the serving base station in step 1319 confirms a list of target base stations contained in the MOB_HO_RSP message, determines one target base station to be a designated target base station according to conditions in step 1321.

Herein, when the MOB_HO_RSP message is a forced handover message, that is, when the 'HO Type' field contained in the MOB_HO_RSP message has been set to have a value of 1, a forced handover is performed according to the procedure described in FIG. 11. In other words, the mobile subscriber station transmits the MOB_HO_IND message in step 1333 and releases a connection with the serving base station in step 1335. Further, the mobile subscriber station is handed over to one base station contained in the list of the target base stations transmitted from the serving base station.

In contrast, when the MOB_HO_RSP message is not the forced handover message, that is, when the 'HO Type' field contained in the MOB_HO_RSP message has been set to have a value of 0, it is possible to continuously measure the CINR of the serving base station according to the third embodiment of the present invention. That is, when the CINR of the serving base station is larger than the CINR of the neighbor base stations in step 1325, the handover can be cancelled in step 1315. Otherwise, the handover can be normally performed. In contrast, when the CINR of the serving base station is still smaller than the CINR of the neighbor base stations, whether to perform a normal handover procedure to the target base station or not, is determined in step 1327. From the result of the determination, the handover is rejected in step 1329 or the handover is performed in steps 1333 and 1335.

As describe above, when the handover has been rejected according to the circumstances of the mobile subscriber station in step 1331, the mobile subscriber station transmits a MOB_HO_REQ message to the serving base station again in step 1312. That is, a case in which the handover is rejected is a case in which the mobile subscriber station has tried to be handed over to the neighbor base station because the serving base station has bad transmission/reception conditions, but the handover is rejected because the neighbor base station also has bad transmission/reception conditions. Herein, since the serving base station may continuously have the bad transmission/reception conditions, it is preferred to transmit a MOB_HO_REQ message to the serving base station again (step 1312) and find target base stations.

However, since the reliability for recommended base stations contained in the MOB_HO_REQ message and selected by the mobile subscriber station may be reduced, it may be preferred to scan all neighbor base stations one more time and to find new recommended base stations having a high reliability. Hereinafter, the latter case will be described with reference to FIG. 14.

Figure 14:
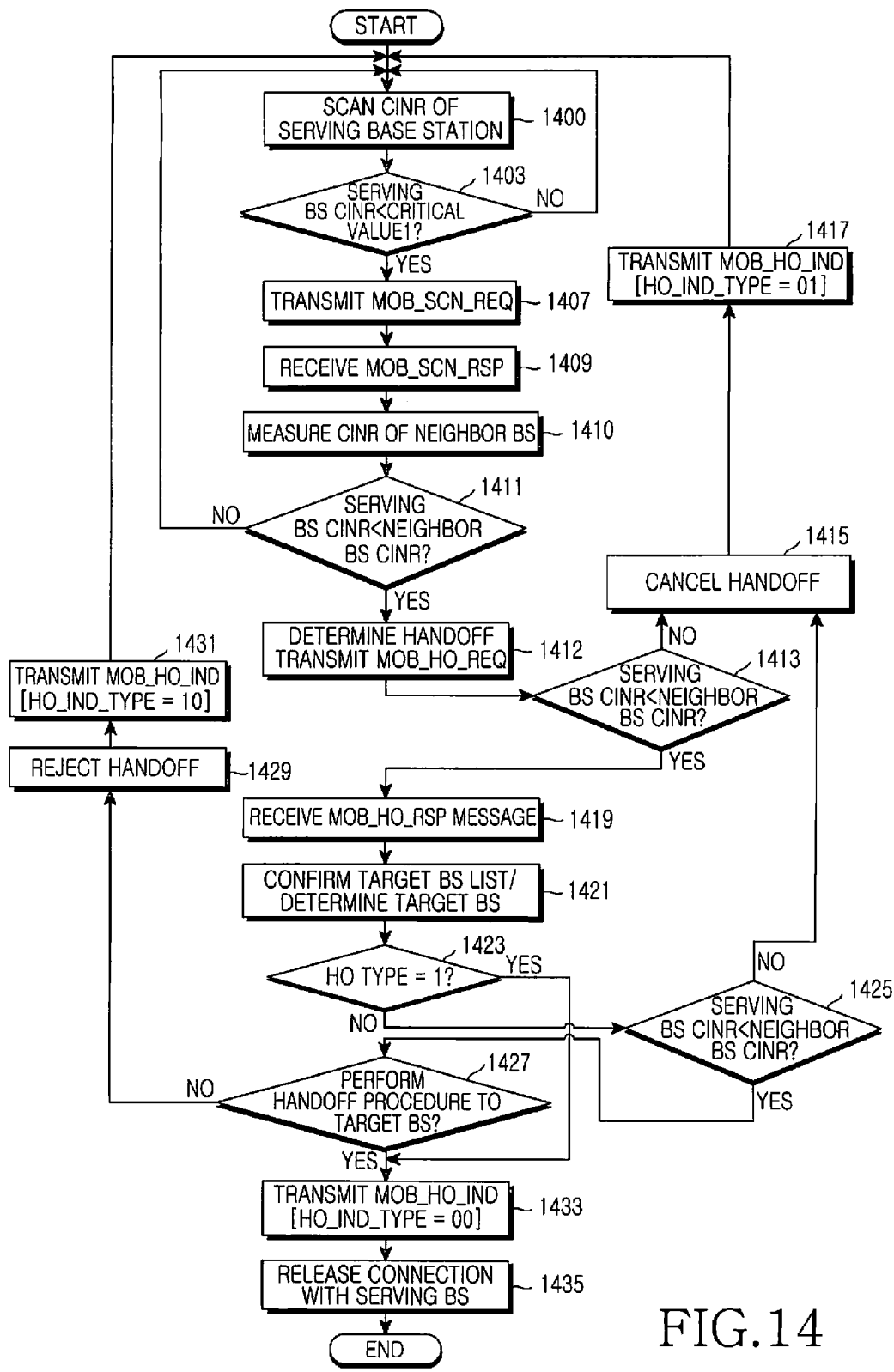
FIG. 14 is a flowchart illustrating a procedure by which a subscriber station cancels or rejects a handover in a broadband wireless access communication system according to a third modified embodiment of the present invention.

FIG. 14 is a flowchart illustrating a procedure by which a mobile subscriber station cancels or rejects a handover in a broadband wireless access communication system according to a third embodiment of the present invention.

Referring to FIG. 14, the third embodiment of FIG. 14 has the same procedure as that of the second embodiment of FIG. 13, except for the aforementioned difference. That is, when the mobile subscriber station rejects the handover in step 1429, the mobile subscriber station transmits a MOB_HO_ND message (i.e., the value of the 'HO Indicator Type' field is set to be 10) representing a handover rejection to the serving base station in step 1431.

Then, the mobile subscriber station performs an initial scanning in step 1400 in order to select new recommended base stations. That is, the mobile subscriber station measure the CINR of the serving base station again, compares the measured CINR of the serving base station with a predetermined threshold value set in advance in step 1403, and performs a scanning for neighbor base stations again in steps 1407, 1409, and 1410. All steps after step 1411 are identical to those of FIG. 13.

As described above, in order to support the mobility of a mobile subscriber station, the present invention further incorporates a function by which a base station enables a mobile subscriber station to be forcedly handed over and a function by which a mobile subscriber station rejects a handover request received from a base station to the conventional handover procedure in a multi-cell structure. In addition, the present invention further incorporates a function by which a base station enables a mobile subscriber station cancels or rejects a handover procedure to maintain a connection with a serving base station again due to the change of the moving direction of the mobile subscriber station while the mobile subscriber station is being handed over from the serving base station to a target base station. Therefore, a handover can be performed with certainty and efficiency.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for performing a handover by a mobile station in a communication system, the method comprising the steps of:
    transmitting a handover request message to a serving base station;
    receiving a first handover response message from the serving base station, wherein the first handover response message comprises a list of at least one neighbor base station;
    determining a value of a handover indication type field from among at least two values individually indicating at least one of a handover cancel and a handover rejection; and
    transmitting a handover indication message comprising the value of the handover indication type field to the serving base station,
    wherein the value representing the handover cancel indicates that the mobile station intends to cancel a handover procedure, and the value representing the handover rejection indicates that the mobile station intends to reject performing handover with any of the at least one neighbor base stations in the list.

2. The method as claimed in claim 1, further comprising:
    receiving a second handover response message, from the serving base station, comprising a new list of at least one neighbor base station if the value represents the handover rejection.

3. The method as claimed in claim 1, wherein the value representing the handover cancel indicates that the mobile station resumes communication with the serving base station.

4. The method as claimed in claim 1, wherein the handover indication message comprises information on a preferred target base station.

5. The method as claimed in claim 1, wherein the value representing the handover rejection indicates that the mobile station intends to reject performing handover with any of the at least one neighbor base stations in the list and to receive a new list different from the list previously received in the first handover response message.

6. A method for performing a handover by a serving base station in a communication system, the method comprising the steps of:
    receiving a handover request message from a mobile station;
    transmitting a first handover response message to the mobile station, wherein the first handover response message comprises a list of at least one neighbor base station; and
    receiving a handover indication message comprising a value of a handover indication type field,
    wherein the value is determined by the mobile station from among at least two values individually indicating at least one of a handover cancel and the handover rejection, and
    wherein the value representing the handover cancel indicates that the mobile station intends to cancel a handover procedure, and the value representing the handover rejection indicates that the mobile station intends to reject performing handover with any of the at least one neighbor base stations in the list.

7. The method as claimed in claim 6, further comprising transmitting a second handover response message, to the mobile station, comprising a new list of at least one neighbor base station if the value represents the handover rejection.

8. The method as claimed in claim 6, wherein the value representing the handover cancel indicates that the mobile station resumes communication with the serving base station.

9. The method as claimed in claim 6, wherein the handover indication message comprises information on a preferred target base station.

10. The method as claimed in claim 6, wherein the value representing the handover rejection indicates that the mobile station intends to reject performing handover with any of the at least one neighbor base stations in the list and to receive a new list different from the list previously received in the first handover response message.

11. A mobile station for performing a handover in a communication system, comprising:
    a transmitter for transmitting a handover request message to a serving base station, and transmitting a handover indication message comprising a value of a handover indication type field to the serving base station;
    a receiver for receiving a first handover response message from the serving base station, wherein the first handover response message comprises a list of at least one neighbor base station; and a processor for determining the value of the handover indication type field from among at least two values individually indicating at least one of a handover cancel and a handover rejection, wherein the value representing the handover cancel indicates that the mobile station intends to cancel a handover procedure, and the value representing the handover rejection indicates that the mobile station intends to reject performing handover with any of the at least one neighbor base stations in the list.

12. The mobile station as claimed in claim 11, wherein the receiver receives a second handover response message, from the serving base station, comprising a new list of at least one neighbor base station if the value represents the handover rejection.

13. The mobile station as claimed in claim 11, wherein the value representing the handover cancel indicates that the mobile station resumes communication with the serving base station.

14. The mobile station as claimed in claim 11, wherein the handover indication message comprises information on a preferred target base station.

15. The mobile station as claimed in claim 11, wherein the value representing the handover rejection indicates that the mobile station intends to reject performing handover with any of the neighbor base station in the list received and to receive a new list different from the list previously received in the first handover response message.

16. A serving base station for performing a handover in a communication system, comprising:

a receiver for receiving a handover request message from a mobile station, and receiving a handover indication message comprising a value of a handover indication type field; and a transmitter for transmitting a first handover response message to the mobile station, wherein the first handover response message comprises a list of at least one neighbor base station, wherein the value is determined by the mobile station from among at least two values individually indicating at least one of a handover cancel and the handover rejection, and wherein the value representing the handover cancel indicates that the mobile station intends to cancel a handover procedure, and the value representing the handover rejection indicates that the mobile station intends to reject performing handover with any of the at least one neighbor base stations in the list.

17. The serving base station as claimed in claim 16, wherein the transmitter transmits a second handover response message, to the mobile station, comprising a new list of at least one neighbor base station if the value represents the handover rejection.

18. The serving base station as claimed in claim 16, wherein the value representing the handover cancel indicates that the mobile station resumes communication with the serving base station.

19. The serving base station as claimed in claim 16, wherein the handover indication message comprises information on a preferred target base station.

20. The serving base station as claimed in claim 16, wherein the value representing the handover rejection indicates that the mobile station intends to reject performing handover with any of the at least one neighbor base stations in the list and to receive a new list different from the list previously received in the first handover response message.

\* \* \* \* \*